United States Patent
Sakawaki et al.

(10) Patent No.: US 6,761,982 B2
(45) Date of Patent: Jul. 13, 2004

(54) MAGNETIC RECORDING MEDIUM, PRODUCTION PROCESS AND APPARATUS THEREOF, AND MAGNETIC RECORDING AND REPRODUCING APPARATUS

(75) Inventors: Akira Sakawaki, Chiba (JP); Hiroshi Sakai, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/029,153

(22) Filed: Dec. 28, 2001

(65) Prior Publication Data

US 2002/0160234 A1 Oct. 31, 2002

(30) Foreign Application Priority Data

Dec. 28, 2000 (JP) ..................... P2000-403307

(51) Int. Cl.[7] .............. G11B 5/66; G11B 5/70; B05D 5/12; C23C 14/00; C23C 14/34
(52) U.S. Cl. .......... 428/694 TS; 428/694 TM; 428/900; 427/131; 204/192.1; 204/192.2
(58) Field of Search ............. 428/694 TS, 694 TM, 428/900; 427/131; 204/192.1, 192.2

(56) References Cited

U.S. PATENT DOCUMENTS 5,866,227 A * 2/1999 Chen et al. ............. 428/65.3
5,989,674 A * 11/1999 Marinero et al. .......... 428/65.3
6,280,813 B1 * 8/2001 Carey et al. ............. 428/65.3
6,534,204 B1 * 3/2003 Akimoto et al. ..... 428/694 TM

FOREIGN PATENT DOCUMENTS

| JP | 62-082516 A | 4/1987 |
|----|----|----|
| JP | 01-220217 A | 9/1989 |
| JP | 05-143988 A | 6/1993 |
| JP | 10-289437 A | 10/1998 |
| JP | 11-283235 A | 10/1999 |
| JP | 11-328646 A | 11/1999 |
| JP | 2000-276726 A | 10/2000 |

* cited by examiner

*Primary Examiner*—Holly Rickman
(74) *Attorney, Agent, or Firm*—Sughrue Mion, PLLC

(57) ABSTRACT

A magnetic recording medium containing a non-magnetic substrate, an orientation-determining layer for causing the non-magnetic undercoat layer assume to have a predominant orientation plane of (200), a non-magnetic undercoat layer, a magnetic layer, and a protective layer, in order, is disclosed. The non-magnetic undercoat layer 3 has a bcc structure; the orientation-determining layer has a crystal structure in which columnar fine crystal grains are inclined in a radial direction; and the ratio of a coercive force in a circumferential direction of the magnetic layer (Hcc) to a coercive force in a radial direction of the magnetic layer 4 (Hcr) is more than 1. The magnetic layer includes a plurality of magnetic films and having an hcp structure and a predominant orientation plane of (110), and permits antiferromagnetic bonding to be formed therebetween.

30 Claims, 9 Drawing Sheets

MAGNETIC RECORDING MEDIUM, PRODUCTION PROCESS AND APPARATUS THEREOF, AND MAGNETIC RECORDING AND REPRODUCING APPARATUS

FIELD OF THE INVENTION

The present invention relates to a magnetic recording medium used in, for example, peripheral devices of calculators, or magnetic disk apparatuses for recording of image and sound data; a process and apparatus for producing the magnetic recording medium; and a magnetic recording and reproducing apparatus incorporating the magnetic recording medium.

BACKGROUND OF THE INVENTION

As recording density of magnetic recording media is increased, there have been proposed reduction in noise and enhancement of resolution by means of, for example, micronization or magnetic isolation of magnetic grains in a magnetic layer, or thinning of a magnetic layer.

However, when magnetic grains are micronized or magnetically isolated, or when a magnetic layer is thinned, the size of the magnetic grains is reduced, and therefore, thermal stability (i.e., thermal decay resistance) of the resultant magnetic recording medium tends to be deteriorated. The term "thermal decay" refers to a phenomenon in which recording bits become unstable and recorded data are lost. In a magnetic recording and reproducing apparatus, thermal decay is manifested in the form of reduction in reproduction output of recorded data with passage of time.

Hitherto, typical substrates for producing magnetic recording media are non-magnetic metallic substrates formed from, for example, an aluminum alloy. Usually, a hard film formed from NiP or similar material is provided on such a non-magnetic metallic substrate in order to harden its surface, then the surface of the substrate is subjected to texturing, and the substrate is used for producing a magnetic recording medium.

Texturing is a process for forming irregularities on the surface of a substrate along a predetermined direction (usually in a circumferential direction) of the substrate. When the surface of a substrate undergoes texturing, the crystal orientation of an undercoat layer and a magnetic layer, which are formed on the substrate, is enhanced, and the magnetic anisotropy of the magnetic layer is enhanced, and thus magnetic characteristics, such as thermal stability, of a magnetic recording medium can be enhanced.

In recent years, instead of a metallic substrate formed from aluminum or similar metal, a non-metallic substrate formed from material such as glass or ceramic has been widely used as a substrate for producing a magnetic recording medium. Such a non-metallic substrate has an advantage that head slap does not easily occur in the substrate, due to high hardness of the substrate. Furthermore, from the viewpoint of glide height characteristics, such a non-metallic substrate is advantageously used, because of its excellent surface smoothness.

However, a non-metallic substrate such as a glass substrate encounters difficulty in undergoing texturing, and involves problems that the magnetic anisotropy of a magnetic layer becomes unsatisfactory, and thermal stability is inclined to be deteriorated.

In order to solve such problems, there has been proposed formation of a hard film which can be easily textured on a non-metallic substrate formed from material such as glass or ceramic.

For example, Japanese Patent Application Laid-Open (kokai) No. 5-197941 discloses a magnetic recording medium including a non-metallic substrate coated, by sputtering, with a NiP film serving as a hard film which is easily textured.

A magnetic recording medium including a hard film formed on a non-metallic substrate is produced by the following process: the hard film is formed on the substrate in a film formation apparatus such as a sputtering apparatus; the substrate is temporarily removed from the apparatus and subjected to texturing by use of a texturing apparatus; the resultant substrate is again placed in the film formation apparatus; and then an undercoat layer and a magnetic layer are formed on the substrate.

However, in the case of the aforementioned conventional magnetic recording medium including a non-magnetic metallic substrate such as an aluminum substrate or a non-metallic substrate such as a glass substrate, when a hard film formed from NiP, which is provided on the substrate, is subjected to texturing, the magnetic anisotropy of a magnetic layer can be enhanced but the surface smoothness of the medium tends to be lowered because of surface irregularities of the hard film. Consequently, glide height characteristics are deteriorated, and attainment of high recording density becomes difficult. In addition, the production process for the magnetic recording medium includes complicated production steps, resulting in high production costs.

SUMMARY OF THE INVENTION

In view of the foregoing, an object of the present invention is to provide a magnetic recording medium which exhibits excellent magnetic characteristics such as thermal stability and excellent glide height characteristics and which is easily produced.

Another object of the present invention is to provide a process and apparatus for producing the magnetic recording medium easily.

A further object of the present invention is to provide a magnetic recording and reproducing apparatus incorporating the magnetic recording medium exhibiting excellent magnetic characteristics such as thermal stability.

The present inventors have found that the thermal stability of a magnetic recording medium can be considerably enhanced when an orientation-determining layer is formed between a non-magnetic substrate and a non-magnetic undercoat layer, the orientation-determining layer has a crystal structure in which columnar fine crystal grains are inclined at an angle in a radial direction, the ratio of a coercive force in a circumferential direction of a magnetic layer (Hcc) to a coercive force in a radial direction of the magnetic layer (Hcr); i.e., Hcc/Hcr, is more than 1, and the magnetic layer includes a plurality of magnetic films and has a structure such that antiferromagnetic bonding can be formed between the magnetic films. The present invention has been accomplished on the basis of this finding.

Accordingly, the present invention provides a magnetic recording medium comprising a non-magnetic substrate, an orientation-determining layer for causing the non-magnetic undercoat layer to have a predominant plane of (200), a non-magnetic undercoat layer, a magnetic layer, and a protective layer, in order, wherein the non-magnetic undercoat layer has a bcc structure; the orientation-determining layer has a crystal structure in which columnar fine crystal grains are inclined in a radial direction; the ratio of a coercive force in a circumferential direction of the magnetic layer (Hcc) to a coercive force in a radial direction of the magnetic layer (Hcr); i.e., Hcc/Hcr, is more than 1; and the magnetic layer includes a plurality of magnetic films having an hcp structure and a predominant orientation plane of (110) plane, and permits antiferromagnetic bonding to be formed therebetween.

In the magnetic recording medium of the present invention, since the orientation-determining layer having a crystal structure in which columnar fine crystal grains are inclined in a radial direction is provided, the ratio of a coercive force in a circumferential direction of the magnetic layer (Hcc) to a coercive force in a radial direction of the magnetic layer (Hcr); i.e., Hcc/Hcr, is more than 1. Thus the magnetic anisotropy of the magnetic layer in a circumferential direction can be enhanced and crystal magnetic anisotropy constant (Ku) can be enhanced. Consequently, magnetic characteristics, such as thermal stability, coercive force, and S/N ratio of recorded/reproduced signals, can be enhanced.

In addition, in the present invention, due to antiferromagnetic bonding between magnetic films, magnetic films other than a primary magnetic film of largest coercive force assume an apparent non-magnetized state; or the primary magnetic film assumes a state in which apparent magnetization of the primary magnetic film is reduced in an amount corresponding to the magnetization of magnetic films other than the primary magnetic film.

Therefore, the volume of magnetic grains can be increased sufficiently without adversely affecting noise and resolution, and thermal stabilization can be attained; i.e., thermal stability can be enhanced.

The magnetic layer may have a laminated ferrimagnetic structure in which the directions of the magnetic moments (or the directions of the magnetization) of adjacent magnetic films are opposite to each other.

The magnetic layer may have a structure including a plurality of magnetic films and an intermediate film provided therebetween.

The magnetic layer may have two or more laminated structures, each including a magnetic film and an intermediate film adjacent thereto.

Preferably, the antiferromagnetic bonding magnetic field of a magnetic film adjacent to a primary magnetic film having the largest coercive force among a plurality of magnetic films is larger than the coercive force of the magnetic film adjacent to the primary magnetic film.

Preferably, the intermediate film is formed from a material predominantly comprising at least one element selected from among Ru, Cr, Ir, Rh, Mo, Cu, Co, Re, and V.

The orientation-determining layer may have a composition which causes the non-magnetic undercoat layer having a bcc structure to have a predominant orientation plane of (200); i.e., a composition formed of one or more elements selected from among Cr, V, Nb, Mo, W, and Ta.

The orientation-determining layer may have a composition which causes the non-magnetic undercoat layer having a bcc structure to have a predominant orientation plane of (200); i.e., a composition formed of an alloy predominantly containing Cr.

The orientation-determining layer may have a composition which causes the non-magnetic undercoat layer having a bcc structure to have a predominant orientation plane of (200); i.e., a composition predominantly containing a Ta-containing alloy $X_1Ta$ (wherein $X_1$ is one or more elements selected from among Be, Co, Cr, Fe, Nb, Ni, V, Zn, and Zr), and may have an Fd3m (space group notation) structure or an amorphous structure.

The orientation-determining layer may have a composition which causes the non-magnetic undercoat layer having a bcc structure to have a predominant orientation plane of (200); i.e., a composition predominantly containing an Nb-containing alloy $X_2Nb$ (wherein $X_2$ is one or more elements selected from among Be, Co, Cr, Fe, Ni, Ta, V, Zn, and Zr), and may have an Fd3m structure or an amorphous structure.

The orientation-determining layer may have a composition which causes the non-magnetic undercoat layer having a bcc structure to have a predominant orientation plane of (200); i.e., a composition predominantly containing CoTa (Ta content: 30–75 at %) or CoNb (Nb content: 30–75 at %), and may have an Fd3m structure or an amorphous structure.

The orientation-determining layer may have a composition which causes the non-magnetic undercoat layer having a bcc structure to have a predominant orientation plane of (200); i.e., a composition predominantly containing CrTa (Ta content: 15–75 at %) or CrNb (Nb content: 15–75 at %).

The orientation-determining layer may have a composition which causes the non-magnetic undercoat layer having a bcc structure to have a predominant orientation plane of (200); i.e., a composition predominantly containing NiTa (Ta content: 30–75 at %) or NiNb (Nb content: 30–75 at %), and may have an Fd3m structure or an amorphous structure.

The orientation-determining layer may have a composition which causes the non-magnetic undercoat layer having a bcc structure to have a predominant orientation plane of (200) plane; i.e., a composition containing a non-magnetic metal having an Fd3m structure.

The orientation-determining layer may have a composition which causes the non-magnetic undercoat layer having a bcc structure to have a predominant orientation plane of (200); i.e., a composition containing a non-magnetic metal having a C15 structure.

In the present invention, an orientation-enhancing layer may be formed between the non-magnetic substrate and the orientation-determining layer.

The orientation-enhancing layer may comprise a material having a B2 structure or an amorphous structure.

The orientation-enhancing layer may predominantly comprise any one selected from among NiAl, FeAl, CoAl, CoZr, CoCrZr, and CoCrC.

In the present invention, a plurality of orientation-determining layers may be provided.

The present invention also provides a magnetic recording medium comprising a non-magnetic substrate, an orientation-determining layer for arranging the crystal orientation of a layer provided directly thereon, a magnetic layer, and a protective layer, the layers being formed on the substrate, wherein the orientation-determining layer has a crystal structure in which columnar fine crystal grains are inclined in a radial direction; the ratio of a coercive force in a circumferential direction of the magnetic layer (Hcc) to a coercive force in a radial direction of the magnetic layer (Hcr); i.e., Hcc/Hcr, is more than 1; and the magnetic layer includes a plurality of magnetic films having an hcp structure and a predominant orientation plane of (110), and permits antiferromagnetic bonding to be formed therebetween.

The present invention also provides a magnetic recording medium comprising a non-magnetic substrate, an orientation-determining layer for arranging the crystal orientation of a layer provided directly thereon, a non-magnetic undercoat layer, a magnetic layer, and a protective layer, in order, wherein the non-magnetic undercoat layer has a bcc structure; the orientation-determining layer is formed from an NiP alloy having an amorphous structure, and can cause the non-magnetic undercoat layer to have a predominant orientation plane of (200); the ratio of a coercive force in a circumferential direction of the magnetic layer (Hcc) to a coercive force in a radial direction of the magnetic layer (Hcr); i.e., Hcc/Hcr, is more than 1; and the magnetic layer includes a plurality of magnetic films having an hcp structure and a predominant orientation plane of (110), and permits antiferromagnetic bonding to be formed therebetween.

The orientation-determining layer may comprise nitrogen or oxygen in an amount of at least 1 at %.

The present invention also provides a process for producing a magnetic recording medium comprising a non-magnetic substrate, an orientation-determining layer for causing the non-magnetic undercoat layer to have a predominant orientation plane of (200), a non-magnetic undercoat layer, a magnetic layer, and a protective layer, in order, wherein the non-magnetic undercoat layer has a bcc structure; and the magnetic layer includes a plurality of magnetic films having an hcp structure and a predominant orientation plane of (110), and permits antiferromagnetic bonding to be formed therebetween, which process comprises forming the orientation-determining layer by releasing film formation particles containing a material constituting the layer from a release source, and then depositing the particles onto a deposition surface, wherein the direction of the trajectory of the film formation particles is controlled so that a projection line of the trajectory of the particles formed on the deposition surface lies substantially along a radial direction of a non-magnetic substrate, and the incident angle of the trajectory of the particles is 10–75° with respect to the non-magnetic substrate.

The orientation-determining layer may be subjected to oxidation or nitridation.

The orientation-determining layer may be formed through sputtering using a sputtering target serving as a release source of film formation particles.

When the orientation-determining layer is formed, the layer may be subjected to oxidation or nitridation using a sputtering gas containing oxygen or nitrogen.

The oxidation or nitridation may be carried out by bringing the surface of the orientation-determining layer into contact with an oxygen-containing gas or a nitrogen-containing gas.

The present invention also provides an apparatus for producing a magnetic recording medium comprising a non-magnetic substrate, a non-magnetic undercoat layer, a magnetic layer, and a protective layer, in order, wherein the non-magnetic undercoat layer has a bcc structure; an orientation-determining layer for causing the non-magnetic undercoat layer to have a predominant orientation plane of (200) is formed between the non-magnetic substrate and the non-magnetic undercoat layer; and the magnetic layer includes a plurality of magnetic films having an hcp structure and a predominant orientation plane of (110), and permits antiferromagnetic bonding to be formed therebetween, which apparatus comprises a release source for releasing film formation particles containing a material constituting the orientation-determining layer, the layer being formed through deposition of the particles onto a deposition surface; and means for controlling the direction of the trajectory of the film formation particles released from the release source. The direction-controlling means can control the direction of the trajectory of the particles so that a projection line of the trajectory of the particles formed on the deposition surface lies substantially along a radial direction of a non-magnetic substrate, and the incident angle of the trajectory of the particles is 10–75° with respect to the non-magnetic substrate.

The present invention also provides a magnetic recording and reproducing apparatus comprising a magnetic recording medium, and a magnetic head for recording data onto the medium and reproducing the data therefrom, wherein the magnetic recording medium comprises a non-magnetic substrate, a non-magnetic undercoat layer, a magnetic layer, and a protective layer, in order, wherein the non-magnetic undercoat layer has a bcc structure; an orientation-determining layer for causing the non-magnetic undercoat layer to have a predominant orientation plane of (200) is formed between the non-magnetic substrate and the non-magnetic undercoat layer; the orientation-determining layer has a crystal structure in which columnar fine crystal grains are inclined in a radial direction; the ratio of a coercive force in a circumferential direction of the magnetic layer (Hcc) to a coercive force in a radial direction of the magnetic layer (Hcr); i.e., Hcc/Hcr, is more than 1; and the magnetic layer includes a plurality of magnetic films having an hcp structure and a predominant orientation plane of (110), and permits antiferromagnetic bonding to be formed therebetween.

DETAILED DESCRIPTION OF THE INVENTION

Figure 1A:
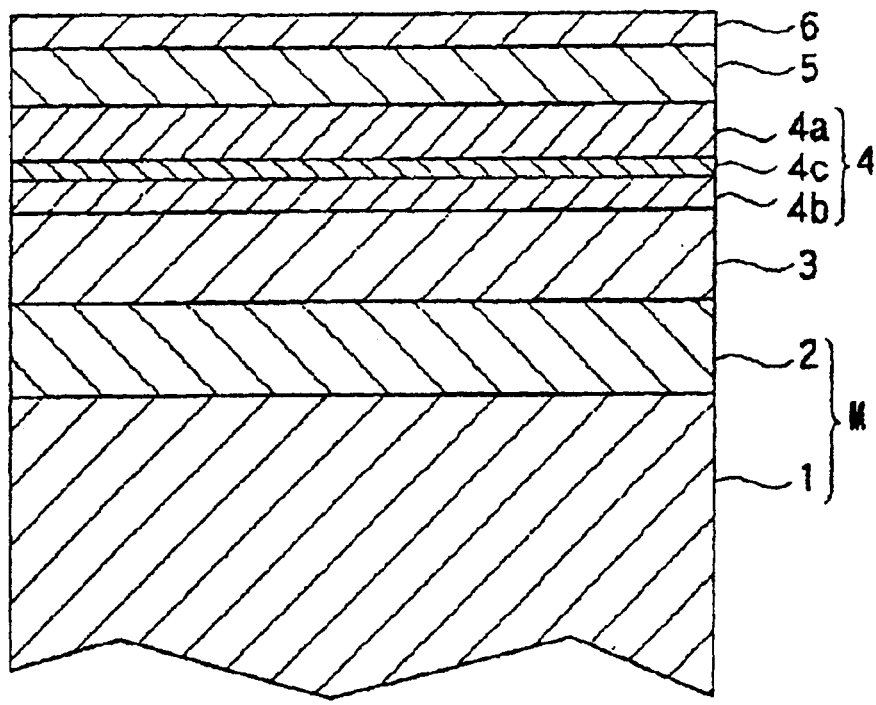
FIG. 1(a) is a partial cross-sectional view showing a first and second embodiment of the magnetic recording medium of the present invention.

FIG. 1 shows a first embodiment of the magnetic recording medium of the present invention. The magnetic recording medium shown in FIG. 1 includes a non-magnetic substrate 1, an orientation-determining layer 2 formed thereon, a non-magnetic undercoat layer 3, a magnetic layer 4, a protective layer 5, and a lubrication layer 6, in order on the layer 2.

Figure 1B:
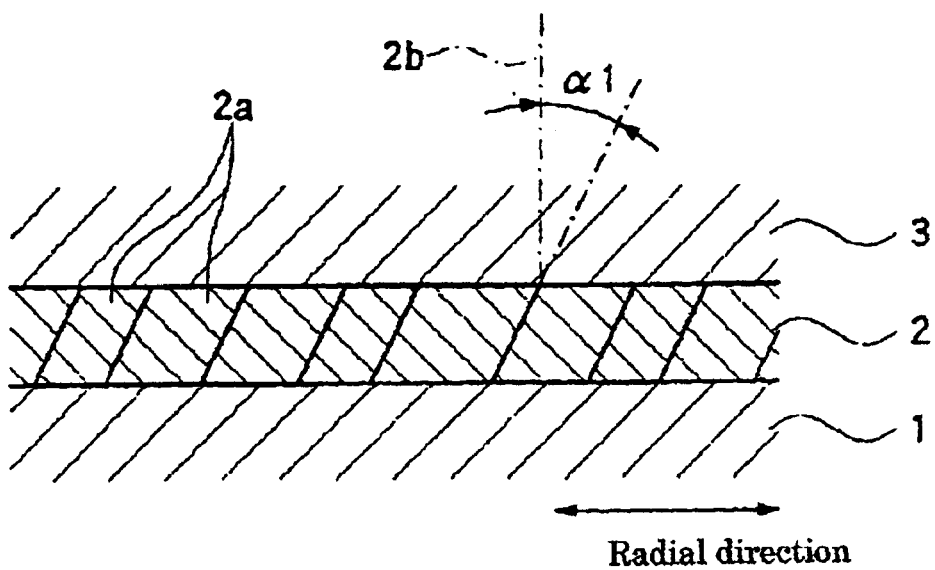
FIG. 1(b) is an enlarged view showing an important portion of the magnetic recording medium shown in FIG. 1(a), which is prepared from the transmission electron microscope (TEM) photograph of the cross section of the medium.

FIG. 1(a) is a cross-sectional view showing the entire structure of the magnetic recording medium of the first embodiment; and FIG. 1(b) is an enlarged view showing an important portion of the magnetic recording medium, derived from a transmission electron microscope (TEM) photograph of a cross section of the medium.

The non-magnetic substrate 1 may be a metallic substrate formed from a metallic material such as aluminum or an aluminum alloy; or a non-metallic substrate formed from a non-metallic material such as glass, ceramic, silicon, silicon carbide, or carbon.

The glass substrate may be formed from amorphous glass or glass ceramic. The amorphous glass may be commonly used soda-lime glass, or aluminosilicate glass. The glass ceramic may be lithium-based glass ceramic.

Meanwhile, a ceramic substrate may be a commonly used sintered compact predominantly containing aluminum oxide, aluminum nitride, and silicon nitride; or fiber-reinforced material thereof.

From the viewpoints of durability and cost, the non-magnetic substrate 1 is preferably a glass substrate.

The non-magnetic substrate 1 may be the aforementioned substrate on which an NiP layer is formed through plating.

As used herein, a non-magnetic metallic substrate formed from, for example, aluminum, and a non-metallic substrate such as a glass substrate will be called "non-magnetic substrate."

The orientation-determining layer 2 is provided for arranging the crystal orientation of the non-magnetic undercoat layer 3 formed directly on the layer 2 and for determining the crystal orientation of the magnetic layer 4 formed on the layer 3, to thereby enhance the magnetic anisotropy of the magnetic layer 4.

The orientation-determining layer, in the first embodiment of the present invention, is preferably formed from one or more elements selected from among Cr, V, Nb, Mo, W, and Ta. When the orientation-determining layer is formed from the above material, the non-magnetic undercoat layer having a bcc structure can have a predominant orientation plane of (200). The predominant orientation plane means the main peak for X-ray diffraction.

The orientation-determining layer 2 may be formed from an alloy predominantly containing Cr (i.e., the Cr content of the alloy is in excess of 50 at %). Particularly, the layer 2 is preferably formed from a $CrX_0$-based alloy (wherein $X_0$ is one or more elements selected from among V, Nb, Mo, Ta, and W). When the orientation-determining layer is formed from the above material, the non-magnetic undercoat layer having a bcc structure can have a predominant orientation plane of (200).

When the orientation-determining layer 2 is formed from a $CrX_0$-based alloy, the $X_0$ content of the alloy is preferably at least 1 at % and less than 50 at %. This is because, when the $X_0$ content falls within the above range, the crystal orientation of the non-magnetic undercoat layer 3 and the magnetic layer 4 can be enhanced, to thereby enhance the magnetic anisotropy of the magnetic layer 4.

The orientation-determining layer 2 may predominantly contain a Ta-containing alloy $X_1Ta$ (wherein $X_1$ is one or more elements selected from among Be, Co, Cr, Fe, Nb, Ni, V, Zn, and Zr), and may have a Fd3m structure or an amorphous structure. When the orientation-determining layer contains the above component and has the above structure, the non-magnetic undercoat layer having a bcc structure can have a predominant orientation plane of (200). The "predominantly" means more than 50 at %.

The orientation-determining layer 2 may predominantly contain an Nb-containing alloy $X_2Nb$ (wherein $X_2$ is one or more elements selected from among Be, Co, Cr, Fe, Ni, Ta, V, Zn, and Zr), and may have a Fd3m structure or an amorphous structure. When the orientation-determining layer contains the above component and has the above structure, the non-magnetic undercoat layer having a bcc structure can have a predominant orientation plane of (200).

The orientation-determining layer 2 may predominantly contain CoTa (Ta content: 30–75 at %) or CoNb (Nb content: 30–75 at %), and may have a Fd3m structure or an amorphous structure. When the orientation-determining layer contains the above component and has the above structure, the non-magnetic undercoat layer having a bcc structure can have a predominant orientation plane of (200).

The orientation-determining layer 2 may predominantly contain CrTa (Ta content: 15–75 at %) or CrNb (Nb content: 15–75 at %). When the orientation-determining layer contains the above component, the non-magnetic undercoat layer having a bcc structure can have a predominant orientation plane of (200).

The orientation-determining layer 2 may predominantly contain NiTa (Ta content: 30–75 at %) or NiNb (Nb content: 30–75 at %), and may have a Fd3m structure or an amorphous structure. When the orientation-determining layer contains the above component and has the above structure, the non-magnetic undercoat layer having a bcc structure can have a predominant orientation plane of (200).

When the orientation-determining layer 2 predominantly contains CoTa, CoNb, CrTa, CrNb, NiTa, or NiNb, the Ta content or Nb content of the alloy preferably falls within the above range. This is because, when the Ta content or Nb content is excessively low, coercive force tends to lower, whereas when the content of Ta or Nb is excessively high, the orientation of the magnetic layer is impaired, potentially resulting in lowering of coercive force.

The orientation-determining layer 2 may be formed from a non-magnetic alloy material containing Ta or Nb in an amount of 30 at % or more. When the orientation-determining layer is formed from the above material, the non-magnetic undercoat layer having a bcc structure can have a predominant orientation plane of (200).

The orientation-determining layer 2 may be formed from a non-magnetic metal having a Fd3m structure. When the orientation-determining layer is formed from the above material, the non-magnetic undercoat layer having a bcc structure can have a predominant orientation plane of (200).

Preferred examples of the non-magnetic metal having a Fd3m structure include $CrX_0$-based alloys having a C15 structure (Skrukturbercht symbol notation), such as CrNbbased alloys (e.g., 70at % Cr-30at % Nb), CrTa-based alloys (e.g., 65at % Cr-35at % Ta), and CrTi-based alloys (e.g., 64at % Cr-36at % Ti).

Examples of the metal having a Fd3m structure include alloys having a C15 structure, such as CoTa-based alloys (e.g., 65at % Co-35at % Ta), CoNb-based alloys (e.g., 70at % Co-30at % Nb), WHf-based alloys (e.g., 66at % W-34at % Hf), and AlY-based alloys (e.g., 67at % Al-33at % Y).

The orientation-determining layer 2 may be formed from, for example, a CoTa-based alloy in which the Co content is relatively low (e.g., 50at % Co-50at % Ta) or an FeNb-based alloy (e.g., 50at % Fe-50at % Nb). When the orientation-determining layer 2 is formed from such a material having an Fd3m structure, the layer is preferably subjected to the below-described oxidation or nitridation during film formation, to thereby regulate the crystal structure (Fd3m structure) of the layer.

The orientation-determining layer 2 serves not only as a layer for determining the crystal orientation of the non-magnetic undercoat layer 3, but also serves as a layer for micronizing crystal grains in the non-magnetic undercoat layer 3 and the magnetic layer 4.

The orientation-determining layer 2 preferably contains nitrogen or oxygen in an amount of at least 1 at %.

This is because, when the layer 2 contains nitrogen or oxygen in an amount of at least 1 at %, the crystal orientation plane of the non-magnetic undercoat layer 3 can assume a (200) plane more reliably, to thereby enhance the magnetic anisotropy of the magnetic layer 4.

As shown in FIG. 1(b), the orientation-determining layer 2 has a crystal structure in which columnar fine crystal grains 2a are inclined in a radial direction of the non-magnetic substrate 1 with respect to a line 2b perpendicular to the substrate 1. The inclination angle $\alpha 1$ of each of the crystal grains 2a (i.e., inclination angle of each of the crystal grains 2a with respect to the perpendicular line 2b) is more than 0° and less than 90°.

The inclination angle $\alpha 1$ of each of the columnar fine crystal grains 2a is preferably 10–75°, more preferably 15–75°, much more preferably 20–75°, and still more preferably 25–55°.

When the inclination angle $\alpha 1$ falls below the above range, the crystal orientation of the non-magnetic undercoat layer 3 and the magnetic layer 4 is impaired, and thus the magnetic anisotropy of the magnetic layer is lowered. In consideration of the structure of a film formation apparatus, controlling the angle $\alpha 1$ to be at a certain value exceeding the above range is difficult.

The inclination angle $\alpha 1$ may be at least 10° and less than 30°. Alternatively, the angle $\alpha 1$ may be more than 65° and less than 90°.

The orientation-determining layer 2 preferably has a structure in which the columnar fine crystal grains 2a are substantially not inclined in a circumferential direction of the substrate 1.

The orientation-determining layer 2 may have a structure in which the inclination angle of the columnar fine crystal grains 2a is gradually increased from the center portion of the layer 2 toward the peripheral portion thereof.

The thickness of the orientation-determining layer 2 is preferably 2–100 nm. When the thickness falls below the above range, the magnetic anisotropy of the magnetic layer is lowered, whereas when the thickness exceeds the above range, productivity is lowered.

The average surface roughness (Ra) of the orientation-determining layer 2 is preferably 0.4 nm or less, more preferably 0.2 nm or less.

When the average surface roughness (Ra) exceeds the above range, surface irregularities of the medium increase, resulting in deterioration of glide height characteristics.

The non-magnetic undercoat layer 3 may be formed from conventionally known undercoat layer materials. For example, the layer 3 may be formed from an alloy of one or more elements of Cr, V, and Ta. Alternatively, the layer 3 may be formed from an alloy of one or more of the above elements and other elements, so long as such "other elements" do not impede the crystallinity of the layer.

Particularly, the layer 3 is preferably formed from Cr or a Cr alloy (e.g., a CrW-based, CrMo-based, or CrV-based alloy).

The layer 3 may be formed from a material having a B2 structure, such as Ni50Al (Ni-50at % Al).

The non-magnetic undercoat layer 3 may have a single-layer structure, or a multi-layer structure formed of two or more different films.

The thickness of the non-magnetic undercoat layer 3 is preferably 1–100 nm, more preferably 2–50 nm.

The non-magnetic undercoat layer 3 has a bcc structure, and the orientation plane of the layer 3 (the predominant crystal plane in the surface of the layer 3) is a (200) plane. Therefore, the magnetic anisotropy of the magnetic layer 4 can be enhanced.

As described below, the magnetic layer 4 has a structure in which antiferromagnetic bonding is formed between a plurality of magnetic films; i.e., an AFC (Anti Ferromagnetic Coupling) structure.

The magnetic layer 4 includes a first magnetic film 4a (upper film), a second magnetic film 4b (lower film), and an intermediate film 4c provided between the films 4a and 4b.

The first and second magnetic films 4a and 4b may be formed from, for example, an alloy of Co and one or more elements selected from among Cr, Pt, Ta, B, Ti, Ag, Cu, Al, Au, W, Nb, Zr, V, Ni, Fe, and Mo.

Preferred, specific examples of the above alloy include CoPt-based alloys, CoCrPt-based alloys, CoCrPtTa-based alloys, CoCrPtB-based alloys, CoCrPtBTa-based alloys, CoCrPtTaCu-based alloys, CoCrPtTaZr-based alloys, CoCrPtTaW-based alloys, CoCrPtCu-based alloys, CoCrPtZr-based alloys, CoCrPtBCu-based alloys, CoCrPtBZr-based alloys, CoNiTa-based alloys, CoNiTaCr-based alloys, and CoCrTa-based alloys.

The magnetic films 4a and 4b may be a granular film in which magnetic grains are dispersed in a non-magnetic matrix such as a non-magnetic metal (e.g., Ag, Ti, Ru, or C), a compound of the non-magnetic metal, an oxide (e.g., $SiO_2$, SiO, or $Al_2O_3$), a nitride (e.g., $Si_3N_4$, AlN, TiN, or BN), a fluoride (e.g., CaF), or a carbide (e.g., TiC).

No particular limitation is imposed on the thickness of the first and second magnetic films 4a and 4b. However, when the thickness is very small, the volume of magnetic grains decreases, resulting in poor thermal stability, whereas when the thickness is very large, magnetization of the magnetic layer becomes excessively large, potentially resulting in an increase in noise.

Therefore, the thickness of the magnetic film 4a is preferably 1–40 nm, more preferably 5–30 nm, and the thickness of the magnetic film 4b is preferably 1–20 nm, more preferably 1–10 nm.

The coercive force of the first magnetic film 4a is preferably 2,000 (Oe) or more, more preferably 3,000 (Oe) or more. When the coercive force falls below the above range, the thermal stability of the magnetic film 4a is lowered, resulting in lowering of the effect of enhancing thermal stability. The coercive force of the first magnetic film 4a is preferably larger than that of the second magnetic film 4b. In this case, the first magnetic film 4a serves as a primary magnetic film having a coercive force larger than that of the second magnetic film 4b, and the coercive force of the entire magnetic layer 4 (magnetic recording medium) becomes equal to that of the primary magnetic film.

The directions of the magnetic moments of the first and second magnetic films 4a and 4b are opposite each other due to antiferromagnetic bonding via the intermediate film 4c, and thus the magnetic layer 4 has a laminated ferrimagnetic structure.

The first and second magnetic films 4a and 4b have an hcp structure, and the orientation plane of each film is a (110) plane.

The intermediate film 4c is preferably formed from a material predominantly containing at least one element selected from among Ru, Cr, Ir, Rh, Mo, Cu, Co, Re, and V. Particularly, the film 4c is preferably formed from Ru.

When the intermediate film 4c is formed from Ru, the thickness of the film 4c is preferably 0.6–1 nm, more preferably 0.7–0.9 nm.

When the thickness falls below or exceeds the above range, antiferromagnetic bonding between the two magnetic films 4a and 4b becomes unsatisfactory, with the result that the effect of enhancing thermal stability is lowered.

When the intermediate film 4c is formed from Cr or a Cr alloy, the thickness of the film 4c is preferably 2–3 nm, more preferably 2.2–2.8 nm. When the thickness falls below or exceeds the above range, antiferromagnetic bonding between the two magnetic films 4a and 4b becomes unsatisfactory, with the result that the effect of enhancing thermal stability is lowered.

The protective layer 5 may be formed from a conventionally known material. For example, the layer 5 may be formed from a material containing a single component such as carbon, silicon oxide, silicon nitride, or zirconium oxide; or a material predominantly containing such components.

The thickness of the protective layer 5 is preferably 2–10 nm.

The lubrication layer 6 may be formed from a fluorine-containing lubricant such as perfluoropolyether.

In the magnetic recording medium having the aforementioned structure, the ratio of a coercive force in a circumferential direction of the magnetic layer 4 (Hcc) to a coercive force in a radial direction of the layer 4 (Hcr); i.e., Hcc/Hcr, is more than 1, preferably 1.1 or more, more preferably 1.2 or more.

When the ratio Hcc/Hcr falls below the above range, the magnetic anisotropy of the magnetic recording medium is insufficient, and thus magnetic characteristics of the medium, such as thermal stability, error rate, and noise characteristics, are unsatisfactory.

An embodiment of the production process for a magnetic recording medium of the present invention will next be described by using the production of the aforementioned magnetic recording medium as an example.

Figure 2:
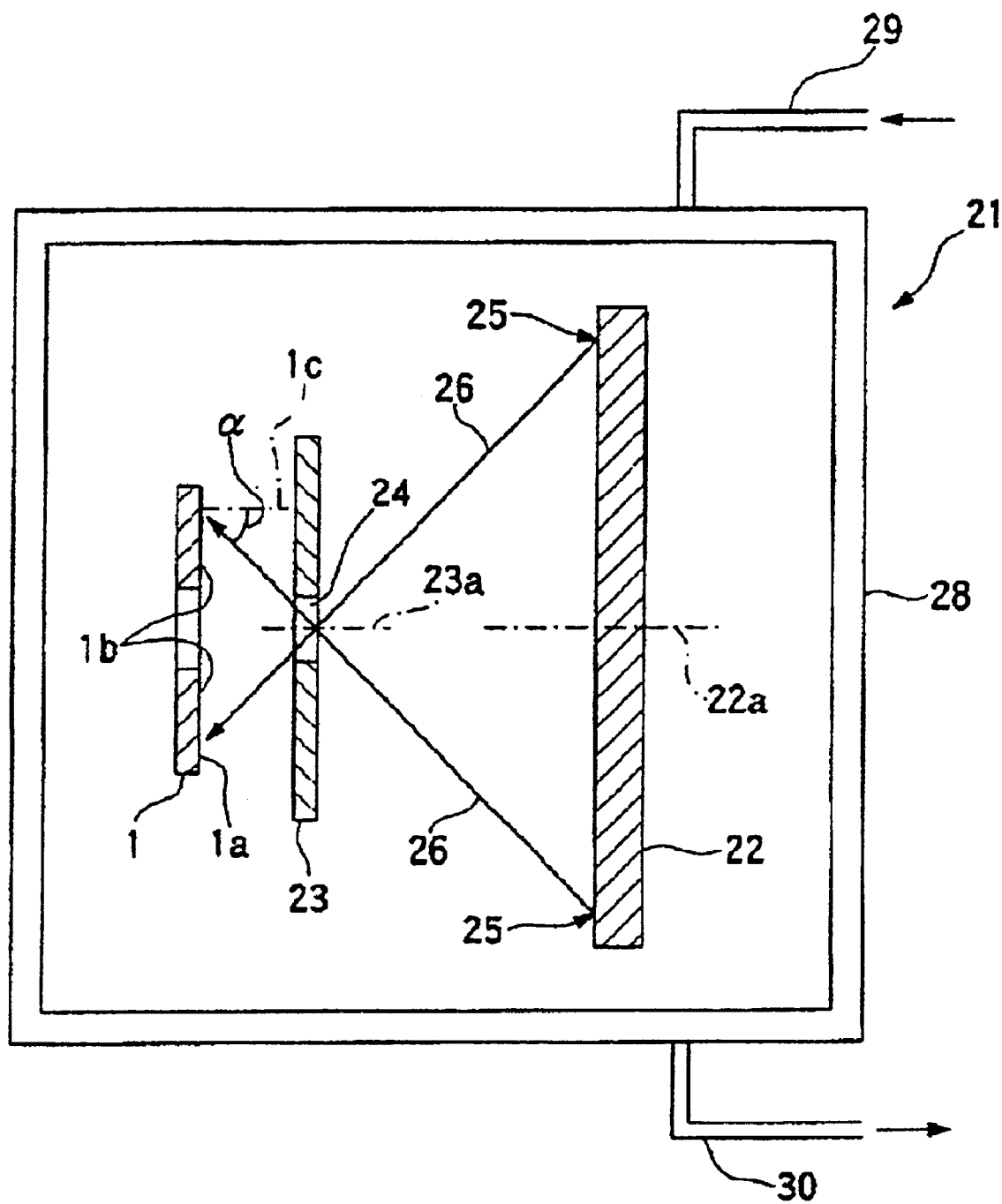
FIG. 2 is a schematic drawing showing an embodiment of a production apparatus for the magnetic recording medium of the present invention.

FIG. 2 shows an embodiment of the apparatus for producing the magnetic recording medium of the present invention.

A sputtering apparatus 21 shown in FIG. 2 is employed for forming the orientation-determining layer 2 (not shown) on the non-magnetic substrate 1. The apparatus 21 includes a chamber 28 which is provided with a sputtering target 22 serving as a release source for releasing film formation particles, and a shielding plate 23 serving as means for determining the direction of the trajectory of the film formation particles released from the sputtering target 22.

A feed line (29) is provided for feeding, for example, a sputtering gas into the chamber 28 and a discharge line (30) is provided for discharging, for example, a sputtering gas from the chamber 28.

The sputtering target 22 contains a material constituting the orientation-determining layer 2, and assumes a disk shape.

The shielding plate 23 is provided for controlling the direction of the trajectory of film formation particles released from the sputtering target 22 by shielding particles released in unintended directions. The shielding plate 23 assumes a disk shape, and has, in its substantially central portion, a circular through-hole 24 through which the film formation particles pass.

The shielding plate 23 is provided so that the plate 23 is substantially parallel to the sputtering target 22 and a predetermined distance is provided between the plate 23 and the target 22.

The shielding plate 23 is provided so that the axis 23a of the plate 23 substantially coincides with the axis 22a of the sputtering target 22.

In order to enhance the accuracy of the incident angle of the film formation particles, the shielding plate 23 is preferably thinned as much as possible. For example, when the employed non-magnetic substrate 1 has an outer diameter of 2.5 inches (63.5 mm), the thickness of the shielding plate 23 is preferably 1.5–5 mm, more preferably 2–4 mm.

The shielding plate 23 is preferably formed from a metallic material exhibiting excellent heat resistance and producing few impurities, such as stainless steel or an aluminum alloy. Particularly, the plate 23 is preferably formed from an aluminum alloy, since film formation particles deposited onto the plate are easily removed, and the alloy is inexpensive.

The diameter of the through-hole 24 is determined such that the incident angle $\alpha$ of released film formation particles is 10–75° with respect to the non-magnetic substrate 1 when the particles are deposited onto a region 1b of the surface 1a of the substrate 1 on which the orientation-determining layer is to be formed.

The incident angle $\alpha$ is an angle with respect to a line 1c perpendicular to the non-magnetic substrate 1.

The diameter of the through-hole 24 is preferably reduced to the greatest possible extent, so long as film formation efficiency is not lowered. For example, when the employed non-magnetic substrate 1 has an outer diameter of 2.5 inches (63.5 mm), the diameter of the through-hole 24 is preferably 20 mm or less, more preferably 15 mm or less, much more preferably 7 mm or less.

When the orientation-determining layer 2 is formed using the sputtering apparatus 21, the non-magnetic substrate 1 is placed in the chamber 28, and the substrate 1 is provided so that the substrate 1 faces the sputtering target 22 with the shielding plate 23 therebetween (i.e., on the left side as shown in FIG. 2). In this case, the non-magnetic substrate 1 is provided so as to be substantially parallel to the sputtering target 22 and the shielding plate 23.

Subsequently, while a sputtering gas such as argon is fed into the chamber 28 through the feed line 29, electricity is supplied to the sputtering target 22, to thereby release film formation particles from the target through sputtering.

Among the film formation particles released from release portions 25 located at a distance from—but on the sputtering target 22—the center portion of the sputtering target 22, the particles directed to the center portion of the shielding plate 23 pass through the through-hole 24, and the rest of the particles are shielded by the shielding plate 23.

Figure 3:
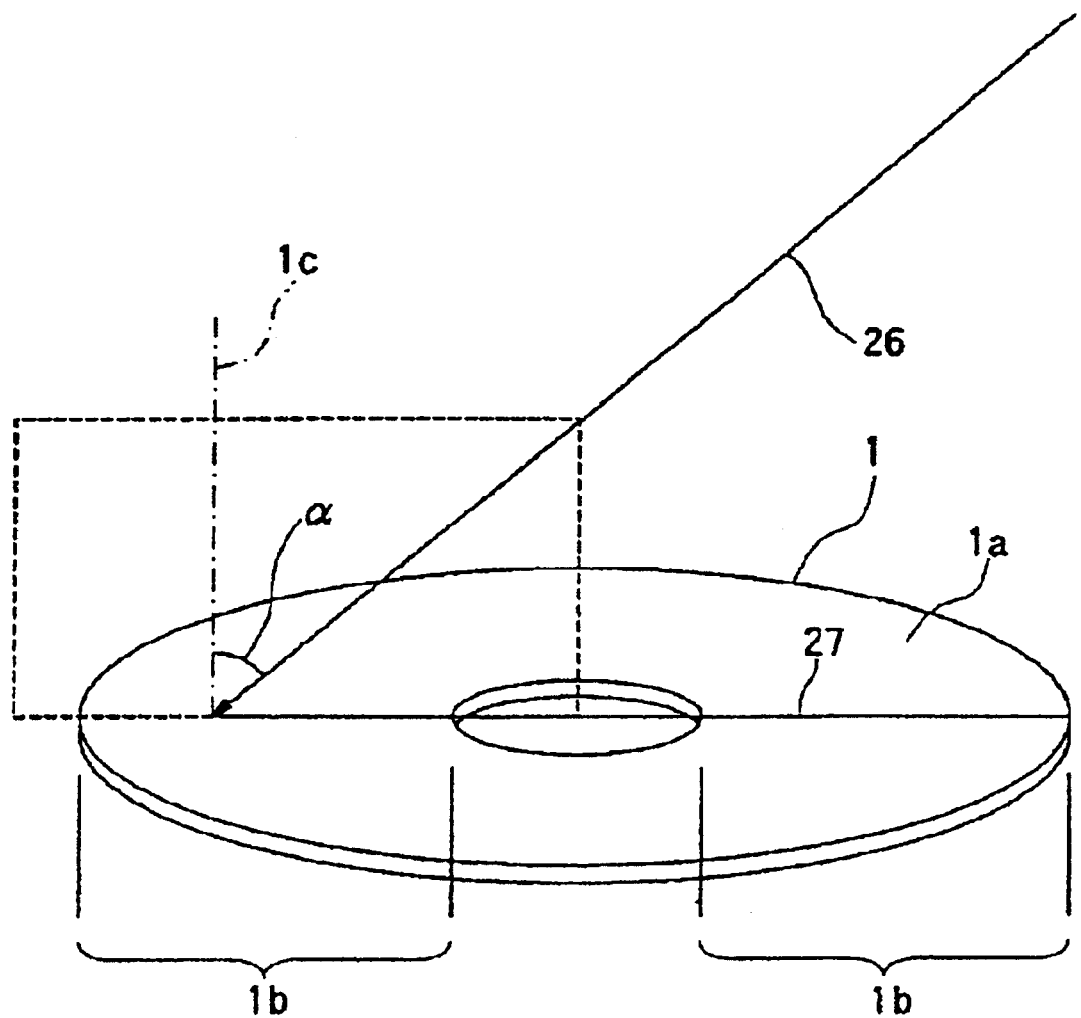
FIG. 3 is an explanatory view showing an embodiment of the production process for the magnetic recording medium of the present invention.

As shown in FIGS. 2 and 3, when the film formation particles released from the release portions 25 located at a distance from—but on the sputtering target 22—the center portion of the target 22 pass through the through-hole 24 provided at the center portion of the shielding plate 23 (see FIG. 2), a projection line 27 of the trajectory 267 of the particles formed on the surface 1a of the non-magnetic substrate 1 lies substantially along a radial direction of the substrate 1 (see FIG. 3). Therefore, the film formation particles are deposited onto the surface 1a uniformly in a circumferential direction of the substrate 1.

The film formation particles are deposited onto the circular region 1b of the surface 1a on which the orientation-determining layer is to be formed, so that the incident angle α of the particles is 10–75°.

The incident angle α is preferably 15–75°, more preferably 20–75°, much more preferably 25–55°.

When the incident angle α falls below the above range, the crystal orientation of the non-magnetic undercoat layer 3 and the magnetic layer 4 is impaired, and the magnetic anisotropy of the magnetic layer is lowered. In consideration of the configuration of the apparatus, controlling the incident angle α at a value exceeding the above range is difficult.

The incident angle α may be at least 10° and less than 30°. Alternatively, the angle α may be in excess of 65° and 75° or less.

When the incident angle α is controlled to fall within the above range, as shown in FIG. 1(b), the orientation-determining layer 2 has a crystal structure in which the columnar fine crystal grains 2a are inclined in a radial direction of the non-magnetic substrate 1 with respect to the line 2b perpendicular to the substrate 1.

The orientation-determining layer 2 is preferably subjected to oxidation or nitridation.

In order to carry out the oxidation or nitridation, when the orientation-determining layer 2 is formed using the sputtering apparatus 21, an oxygen- or nitrogen-containing sputtering gas may be fed into the chamber 28 through the feed line 29.

The oxygen-containing sputtering gas may be a gas mixture of oxygen and argon. The nitrogen-containing sputtering gas may be a gas mixture of nitrogen and argon.

The oxygen content or nitrogen content of the gas mixture is preferably 1–50 vol %.

In the present invention, the oxidation or nitridation may be carried out by bringing the surface of the orientation-determining layer 2 into contact with an oxygen- or nitrogen-containing gas, after completion of formation of the layer 2.

The oxygen-containing gas may be air, pure oxygen, or steam. Alternatively, the oxygen-containing gas may be an oxygen-rich gas consisting of air in which the oxygen content is increased. The oxygen-rich means that the content of oxygen-gas is more than other gas.

The nitrogen-containing gas may be air, pure nitrogen, or a nitrogen-rich gas.

Specifically, in order to bring the surface of the orientation-determining layer 2 into contact with the oxygen- or nitrogen-containing gas, after the layer 2 is formed on the substrate 1 in the sputtering apparatus 21 as described above, the oxygen- or nitrogen-containing gas is fed into the chamber 28 through the feed line 29.

The oxygen content or nitrogen content of the oxygen- or nitrogen-containing gas may be 1–100 vol %.

When the amount of oxygen or nitrogen fed into the chamber, or the time of exposure to oxygen or nitrogen is appropriately determined, the extent of oxidation of the orientation-determining layer 2 can be regulated. For example, when the orientation-determining layer 2 is exposed to an oxygen gas atmosphere of $10^{-3}$ Pa or more under a vacuum of $10^{-4}$ to $10^{-6}$ Pa for 0.1–30 seconds, the layer 2 assumes a predetermined oxidized state.

Use of such an oxygen- or nitrogen-containing gas facilitates oxidation or nitridation of the layer 2.

Through the oxidation or nitridation, at least the area in proximity to the surface of the orientation-determining layer 2 is oxidized or nitridized.

In one method for carrying out the oxidation or nitridation, the orientation-determining layer 2 is formed using an oxygen- or nitrogen-containing sputtering gas, and then the surface of the layer 2 is brought into contact with an oxygen- or nitrogen-containing gas. Alternatively, the surface of the orientation-determining layer 2 may be exposed to air.

The non-magnetic undercoat layer 3 and the magnetic layer 4 may be formed by sputtering.

Being grown under the influence of the orientation-determining layer 2, the non-magnetic undercoat layer 3 exhibits excellent crystal orientation. The non-magnetic undercoat layer 3 has a bcc structure, and the orientation plane (the predominant crystal orientation plane in the surface of the layer 3) is a (200) plane.

Since the non-magnetic undercoat layer 3 exhibits excellent crystal orientation, the crystal orientation of the magnetic layer 4 formed on the layer 3 is enhanced. The first and second magnetic films 4a and 4b of the magnetic layer 4 have an hcp structure, and the orientation plane (the predominant crystal orientation plane in the surface of the layer 4) is a (110) plane.

The protective layer 5 may be formed through plasma CVD or sputtering.

The lubrication layer 6 may be formed by applying a lubricant such as a fluorine-containing liquid lubricant (e.g., perfluoropolyether) onto the protective layer 5 through dipping.

In the magnetic recording medium of the embodiments shown in FIG. 1(a), the orientation-determining layer 2 for arranging the crystal orientation of a layer provided directly thereon is formed between the non-magnetic substrate 1 and the non-magnetic undercoat layer 3, and the layer 2 has a crystal structure in which the columnar fine crystal grains 2a are inclined in a radial direction of the substrate 1. Therefore, the crystal orientation of the non-magnetic undercoat layer 3 and the magnetic layer 4 can be improved, and the magnetic anisotropy of the magnetic layer 4 in a circumferential direction can be enhanced.

Since the magnetic anisotropy of the magnetic layer 4 in a circumferential direction is enhanced, the crystal magnetic anisotropy constant (Ku) can be enhanced, resulting in improvement of thermal stability.

Furthermore, since the magnetic layer 4 includes the first and second magnetic films 4a and 4b, and has a structure such that antiferromagnetic bonding is formed between the magnetic films, apparent magnetization of the magnetic layer is reduced due to antiferromagnetic bonding between the magnetic films 4a and 4b.

Therefore, the volume of magnetic grains can be increased sufficiently without adversely affecting noise characteristics and resolution, and thermal stabilization can be attained. Accordingly, thermal stability can further be enhanced.

In general, the strength of antiferromagnetic bonding between two magnetic films is greatly affected by the thickness of an intermediate film provided between the magnetic films. For example, in the case in which the intermediate film is formed from Ru, when the thickness of the intermediate film is about 0.8 nm, the strength of antiferromagnetic bonding between the magnetic films becomes maximum. When the thickness of the intermediate film is slightly increased or decreased from the above thickness corresponding to the maximum strength of the antiferromagnetic bonding, the strength of the antiferromagnetic bonding is drastically reduced.

Therefore, in the case in which a magnetic layer has an antiferromagnetic coupling structure (AFC structure), when a film formed below the magnetic layer has large surface irregularities, the thickness of the intermediate film becomes non-uniform, the strength of antiferromagnetic bonding is lowered locally, and thus thermal stability tends to become unsatisfactory.

In contrast, in the magnetic recording medium of the embodiments shown in FIG. 1(a), since the magnetic anisotropy of the magnetic layer 4 can be enhanced, texturing is not required during production of the medium. Therefore, non-uniformity in the thickness of the intermediate film 4c, which is caused by surface irregularities formed through texturing, can be prevented, the strength of antiferromagnetic bonding can be enhanced, and a satisfactory effect of enhancing thermal stability can be obtained.

Meanwhile, since the surface smoothness of the orientation-determining layer 2 can be enhanced, the average surface roughness (Ra) of the medium is reduced, and excellent glide height characteristics can be obtained.

Since a texturing step is not necessary during production of the medium, the production process is simplified and production costs can be reduced.

Since the magnetic anisotropy of the magnetic layer 4 in a circumferential direction can be enhanced, half power width of isolated read pulse can be reduced, and the resolution of reproduction output can be enhanced. Therefore, error rate can be improved.

When the magnetic anisotropy is enhanced, coercive force and reproduction output can be enhanced. Therefore, noise characteristics such as SNR can be improved.

In addition, crystal grains in the non-magnetic undercoat layer 3 become fine. Consequently, magnetic grains in the magnetic layer 4 which is grown under the influence of the layer 3 can become fine and uniform, resulting in reduction in noise. Therefore, noise characteristics can further be improved.

When the orientation-determining layer 2 is formed from a non-magnetic metal having a Fd3m structure, the crystal orientation of the non-magnetic undercoat layer 3 and the magnetic layer 4 is improved, and the magnetic anisotropy of the magnetic film 4 can further be enhanced.

In the production process of the aforementioned embodiment, when film formation particles are released from the sputtering target 22 and deposited onto the surface 1a of the non-magnetic substrate 1, to thereby form the orientation-determining layer 2, the direction of the trajectory of the film formation particles is controlled so that the projection line 27 of the trajectory 267 of the particles formed on the substrate 1 lies substantially along a radial direction of the substrate 1, and the incident angle $\alpha$ of the trajectory is 10–75° with respect to the substrate 1. Therefore, the magnetic anisotropy of the magnetic layer 4 can be enhanced. Consequently, thermal stability can be enhanced.

Furthermore, magnetic characteristics, such as error rate and noise characteristics, can be enhanced, and excellent glide height characteristics can be obtained.

Since the magnetic anisotropy of the magnetic layer 4 can be enhanced without carrying out texturing, deterioration of glide height characteristics can be prevented, which deterioration is attributed to an increase in the average surface roughness of the medium caused by surface irregularities formed through texturing.

In addition, since a texturing step is not necessary during production of the medium, the production process is simplified and production costs can be reduced.

Oxidation or nitridation of the surface of the orientation-determining layer 2 can cause the non-magnetic undercoat layer 3 to have an orientation plane of (200), further enhance the magnetic anisotropy of the magnetic layer 4, and improve thermal stability, error rate, noise characteristics, etc. of the magnetic recording medium.

In the aforementioned production process, since the orientation-determining layer 2 is formed by sputtering using the sputtering target 22 serving as a release source of film formation particles, formation of the orientation-determining layer 2 is carried out easily.

When the orientation-determining layer 2 is formed using an oxygen- or nitrogen-containing sputtering gas, formation of the layer 2, and oxidation or nitridation of the layer 2 can be carried out in a single step, and thus the production step can be simplified. Consequently, operation is simplified and productivity can be enhanced.

When the oxidation or nitridation of the orientation-determining layer 2 is carried out by bringing the surface of the layer 2 into contact with an oxygen- or nitrogen-containing gas, firstly the layer 2 is formed on the non-magnetic substrate 1 by use of the sputtering apparatus 21, and subsequently, without removal of the thus-formed medium substrate M (the non-magnetic substrate 1 and the orientation-determining layer 2 formed thereon) from the apparatus 21, the surface of the layer 2 is subjected to oxidation or nitridation in the same apparatus 21.

Therefore, simplification of the production step and operation, and enhancement of productivity can be attained.

Since the aforementioned sputtering apparatus 21 includes the sputtering target 22 serving as a release source of film formation particles, and the shielding plate 23 for controlling the direction of the trajectory of the released film formation particles, the incident direction of the trajectory of the particles with respect to the non-magnetic substrate 1 can be accurately controlled.

Therefore, the crystal orientation of the non-magnetic undercoat layer 3 and the magnetic layer 4 is improved, and the magnetic anisotropy of the magnetic layer 4 can be reliably enhanced.

In the present invention, the orientation-determining layer may be formed from an NiP alloy having an amorphous structure (an amorphous NiP alloy).

FIG. 1(a) shows an example of the magnetic recording medium including the orientation-determining layer formed from an amorphous NiP alloy.

A second embodiment of the magnetic recording medium of the present invention will be described with reference to FIG. 1(a).

In the magnetic recording medium of the second embodiment, preferably, the orientation-determining layer 2 is formed from an NiP alloy, and the Ni content of the alloy is 50–90 at %.

The orientation-determining layer 2 containing an amorphous NiP alloy may be formed in a manner similar to that of the aforementioned production process.

Specifically, the sputtering apparatus 21 including the sputtering target 22 containing an amorphous NiP alloy and the shielding plate 23 is employed, and film formation particles released from the sputtering target 22 are deposited onto the surface 1a of the non-magnetic substrate 1 such that the incident angle α of the trajectory of the particles is 10–75° with respect to the substrate 1.

When the orientation-determining layer 2 is formed, the layer 2 is subjected to oxidation or nitridation according to the aforementioned process, by employing an oxygen- or nitrogen-containing sputtering gas or by bringing the layer 2 into contact with an oxygen- or nitrogen-containing gas. Consequently, at least the surface of the orientation-determining layer 2 may be crystallized.

In the resultant magnetic recording medium, the ratio of a coercive force in a circumferential direction of the magnetic layer 4 (Hcc) to a coercive force in a radial direction of the layer 4 (Hcr); i.e., Hcc/Hcr, is more than 1, preferably 1.1 or more, more preferably 1.2 or more.

In the magnetic recording medium of the second embodiment, similar to the case of the magnetic recording medium of the first embodiment, the crystal orientation of the non-magnetic undercoat layer 3 and the magnetic layer 4 is improved, and the magnetic anisotropy of the magnetic layer can be enhanced.

Therefore, magnetic characteristics, such as thermal stability, error rate, and noise characteristics, can be improved. In addition, glide height characteristics can be enhanced.

Figure 4:
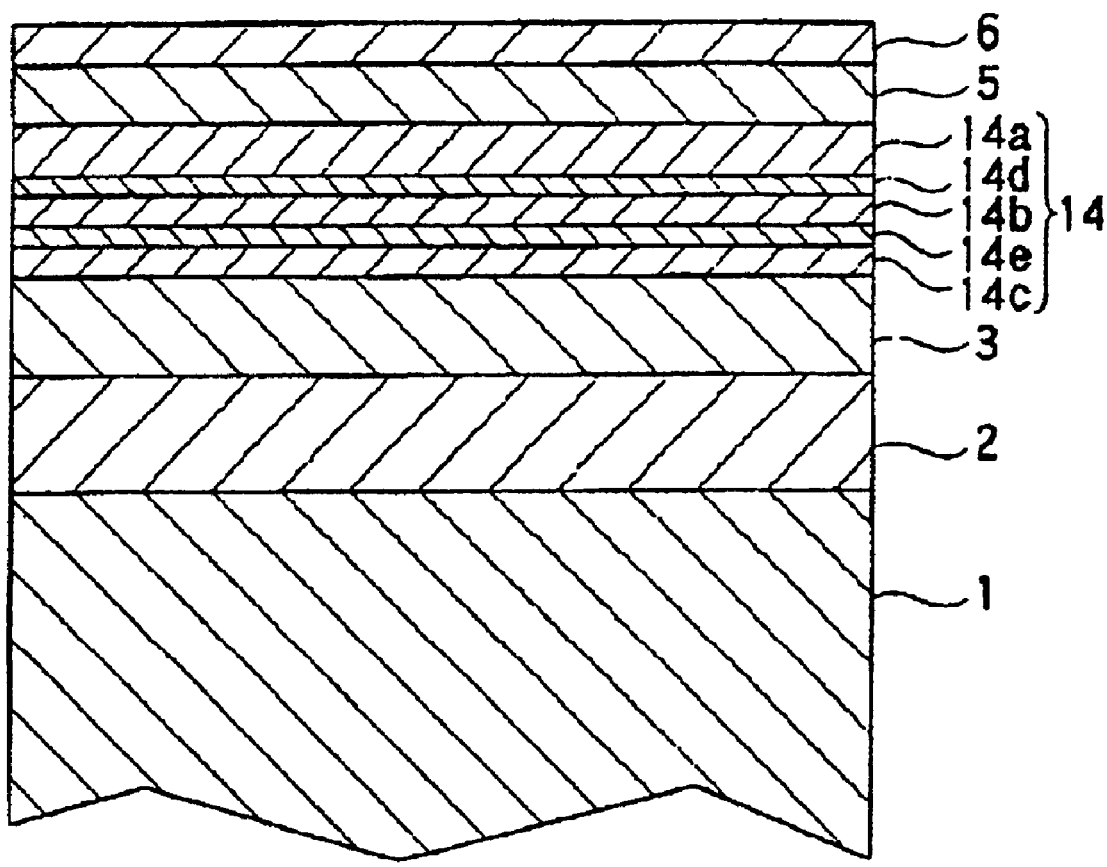
FIG. 4 is a partial cross-sectional view showing a third embodiment of the magnetic recording medium of the present invention.

FIG. 4 shows a third embodiment of the magnetic recording medium of the present invention. The magnetic recording medium shown in FIG. 4 differs from the medium shown in FIG. 1 in that a magnetic layer 14 includes a first magnetic film 14a (uppermost film), a second magnetic film 14b, a third magnetic film 14c (lowermost film), a first intermediate film 14d provided between the first and second magnetic films 14a and 14b, and a second intermediate film 14e provided between the second and third magnetic films 14b and 14c.

The first, second, and third magnetic films 14a, 14b, and 14c may be formed from the magnetic material described above as the material of the magnetic films 4a and 4b.

The coercive force of the first magnetic film 14a (Hc1) is preferably 2,000 (Oe) or more, more preferably 3,000 (Oe) or more. When the coercive force (Hc1) falls below the above range, the thermal stability of the magnetic film 14a is lowered, resulting in lowering of the effect of enhancing thermal stability. The coercive force of the first magnetic film 14a (Hc1) is preferably larger than the coercive force of the second magnetic film 14b (Hc2) or the coercive force of the third magnetic film 14c (Hc3). In this case, the first magnetic film 14a serves as a primary magnetic film having the largest coercive force.

No particular limitation is imposed on the thickness of the first, second, and third magnetic films 14a, 14b, and 14c. However, when the thickness is very small, the volume of magnetic grains decreases, resulting in poor thermal stability, whereas when the thickness is very large, magnetization of the magnetic layer becomes excessively large, potentially resulting in an increase in noise.

Therefore, the thickness of the first magnetic film 14a is preferably 1–40 nm, more preferably 5–30 nm, and the thickness of the second and third magnetic films 14b and 14c is preferably 1–20 nm, more preferably 1–10 nm.

The material and the thickness of the first and second intermediate films 14d and 14e may be similar to those of the aforementioned intermediate film 4c.

In the magnetic recording medium of the third embodiment, preferably, the antiferromagnetic bonding magnetic field of the second magnetic film 14b, which is adjacent to; via the intermediate film 14d, the first magnetic film 14a having the largest coercive force is larger than the coercive force of the magnetic film 14b.

The reason for this will next be described with reference to FIGS. 5(A) and (B).

Figure 5A:
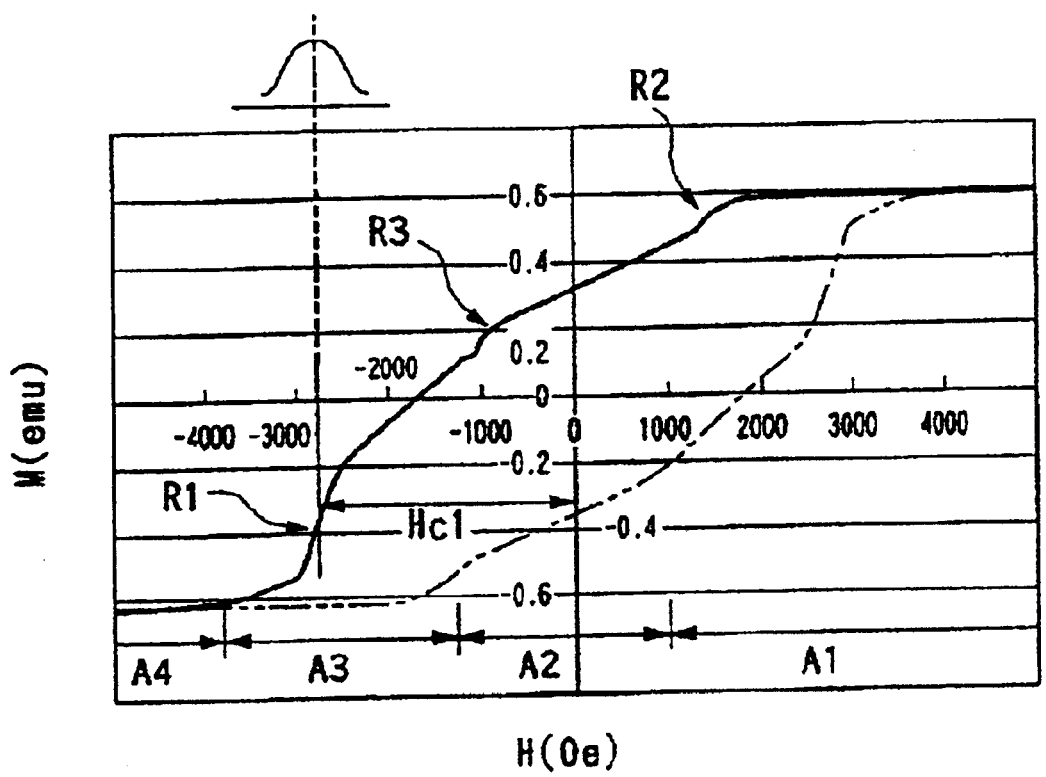
FIG. 5(A) is a graph showing a hysteresis loop of the magnetic recording medium shown in FIG. 4.

FIGS. 5(A) and (B) show a hysteresis loop of the magnetic recording medium of the third embodiment.

In the magnetic recording medium, since magnetization inversion occurs not only in the uppermost magnetic film (the first magnetic film 14a) but also in the other magnetic films (the second and third magnetic films 14b and 14c), the hysteresis loop has a plurality of steps (magnetization inversion portions).

Specifically, as shown in FIG. 5(A), the hysteresis loop formed while external magnetic field H is reduced has a magnetization inversion portion R2 of the second magnetic film 14b (which is present in the first quadrant in which the external magnetic field H and magnetization M are positive), a magnetization inversion portion R3 of the third magnetic film 14c, and a magnetization inversion portion R1 of the first magnetic film 14a.

At the magnetization inversion portions R2, R3, and R1, percent reduction in magnetization drastically increases when the external magnetic field H is reduced. In FIGS. 5(A) and (B), the broken line shows a portion of a hysteresis loop (minor loop) formed while the external magnetic field H is increased and decreased in the vicinity of the magnetization inversion portions.

In the case of the magnetic recording medium, within region A1 shown in FIG. 5(A) in which the external magnetic field H is sufficiently high, all the three magnetic films are magnetized in a positive direction. However, when the external magnetic field H is reduced, the magnetization direction of the second magnetic film 14b is inverted at the magnetization inversion portion R2, and in region A2, the second magnetic film 14b is magnetized in a negative direction.

When the external magnetic field H is further reduced, the magnetization direction of the third magnetic film 14c is inverted at the magnetization inversion portion R3, and in region A3, the third magnetic film 14c is magnetized in a negative direction.

When the external magnetic field H is further reduced, the magnetization direction of the first magnetic film 14a is inverted at the magnetization inversion portion R1, and the first magnetic film 14a is magnetized in a negative direction. In region A4, the first magnetic film 14a is magnetized completely in a negative direction. In the region A4, the coercive force of the entire magnetic layer 14 (Hc) becomes substantially equal to the coercive force of the first magnetic film 14a (Hc1), the film having the largest coercive force. The external magnetic field H corresponding to the peak of the absolute value of the differential value of the hysteresis loop in the vicinity of the magnetization inversion portion R1 is called the coercive force (Hc1).

External magnetic fields corresponding to peaks of the absolute value of the differential value of the hysteresis loop (minor loop) MR2 in the vicinity of the magnetization inversion portion R2 are called Hc2A and Hc2B, and the average of the Hc2A and Hc2B is called antiferromagnetic bonding magnetic field Hbias2. The difference between Hc2A and Hbias2 is called the coercive force of the second magnetic film 14b (Hc2).

Figure 5B:
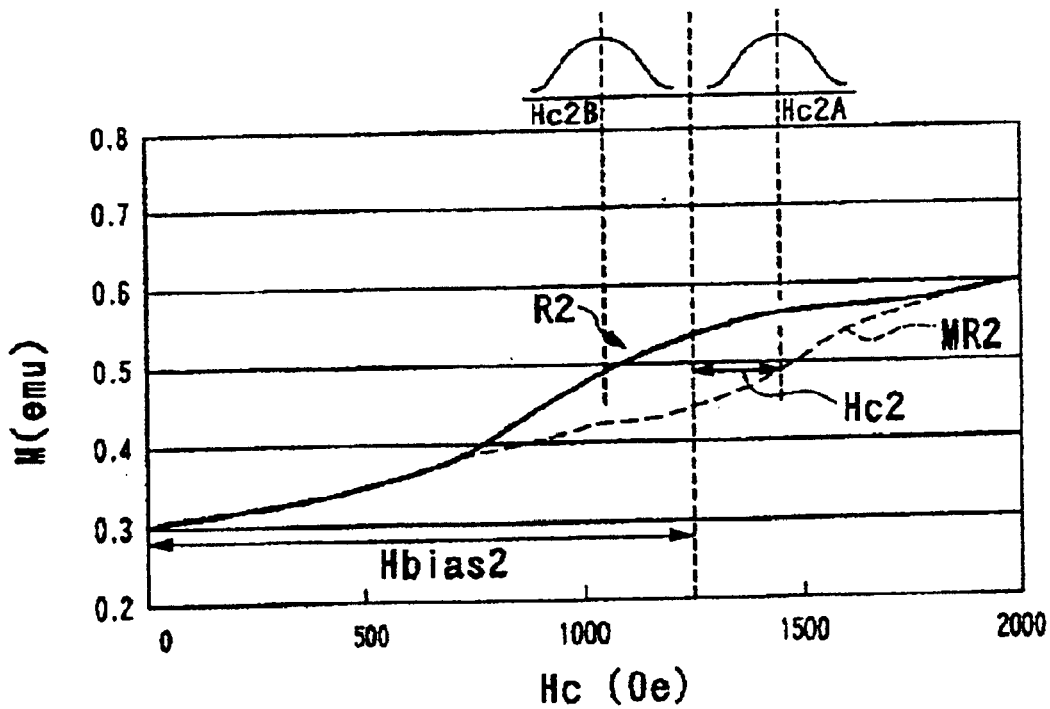
FIG. 5(B) is a graph showing a minor hysteresis loop in the vicinity of R2 of the magnetic recording medium shown in FIG. 4.

In the magnetic recording medium, as shown in FIG. 5(B), the antiferromagnetic bonding magnetic field Hbias2; i.e., the external magnetic field H corresponding to the center of the hysteresis loop (minor loop) MR2 at the magnetization inversion portion R2 of the second magnetic film 14b, is larger than the coercive force of the second magnetic film (Hc2).

Therefore, after all the three magnetic films are magnetized in a positive direction through application of high external magnetic field H, when the magnetic field H is reduced to zero, the magnetization direction of the second magnetic film 14b is inverted reliably, and the film 14b is magnetized in a negative direction, due to antiferromagnetic bonding between the film 14b and the adjacent magnetic films 14a and 14c.

Therefore, in the case of reproduction when the external magnetic field is zero, because of the antiferromagnetic bonding, apparent magnetization of the magnetic layer 14 becomes the value obtained by subtracting the magnetization of the magnetic film 14b from the total magnetization of the magnetic films 14a, 14b, and 14c. Consequently, apparent magnetization of the entire magnetic layer 14 is reduced, and the effect of enhancing thermal stability can be obtained reliably, without causing deterioration of noise characteristics and resolution.

In contrast, when the antiferromagnetic bonding magnetic field Hbias2 is smaller than the coercive force Hc2, the antiferromagnetic bonding between the magnetic films becomes unsatisfactory. Therefore, even when the external magnetic field is zero, the magnetization direction of the second magnetic film 14b is not inverted, and the magnetization of the entire magnetic layer 14 increases during reproduction. As a result, noise characteristics and resolution may be adversely affected. In addition, since the antiferromagnetic bonding between the magnetic films becomes unsatisfactory, the effect of increasing the effective volume of magnetic grains is lowered, potentially resulting in lowering of the effect of enhancing thermal stability.

In the magnetic recording medium of the third embodiment, the magnetic layer 14 includes the first, second, and third magnetic films 14a, 14b, and 14c, the first intermediate film 14d provided between the magnetic films 14a and 14b, and the second intermediate film 14e provided between the magnetic films 14b and 14c. Therefore, as compared with the magnetic recording medium of the first embodiment including two magnetic films (see FIG. 1(a)), the thickness of the magnetic film 14a can be reduced without decreasing the effective volume of magnetic grains of the entire magnetic layer 14. Consequently, thermal stability can be enhanced, disturbance of magnetization direction in the magnetic film 14a can be minimized, and noise characteristics and resolution during recording and reproduction can be improved.

In the magnetic recording medium of the third embodiment, the magnetic layer H has two laminated structures, each including the magnetic film and the intermediate film adjacent thereto (i.e., a first laminated structure including the magnetic film 14b and the intermediate film 14d, and a second laminated structure including the magnetic film 14c and the intermediate film 14e). In the present invention, the magnetic layer may have three or more laminated structures, each including the magnetic film and the intermediate film adjacent thereto.

In this case, the effective volume of magnetic grains of the magnetic film can further be increased, and thus thermal stability can be enhanced.

Figure 6:
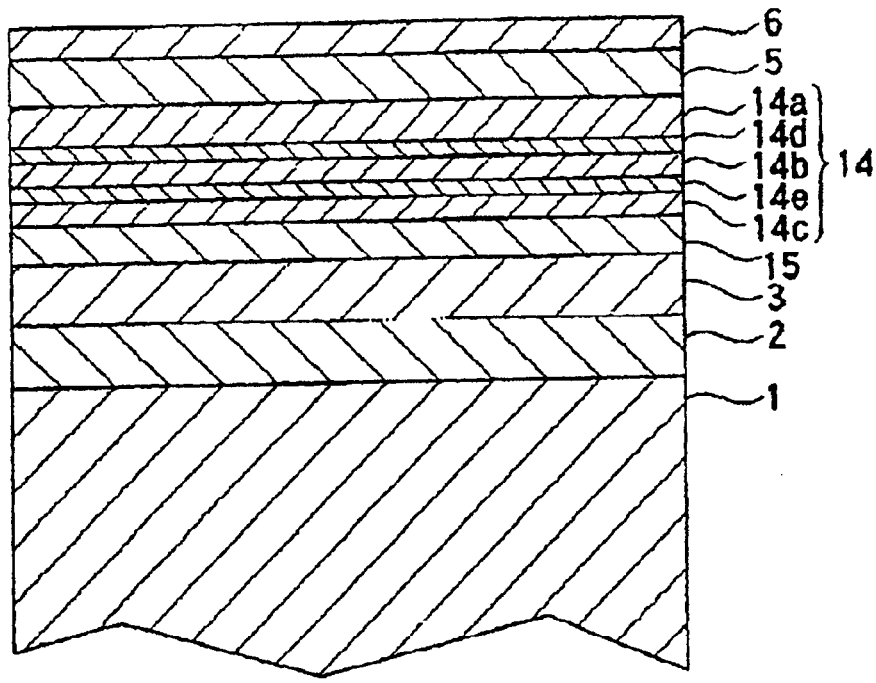
FIG. 6 is a partial cross-sectional view showing a fourth embodiment of the magnetic recording medium of the present invention.

FIG. 6 shows a fourth embodiment of the magnetic recording medium of the present invention. The magnetic recording medium shown in FIG. 6 includes a non-magnetic intermediate layer 15 provided between the non-magnetic undercoat layer 3 and the magnetic layer 14.

The non-magnetic intermediate layer 15 is preferably formed from a non-magnetic material having an hcp structure. The non-magnetic intermediate layer 15 is preferably formed from a CoCr-based alloy. The layer 15 may be formed from an alloy of CoCr and one or more species selected from among Pt, Ta, ZrNb, Cu, Re, Ni, Mn, Ge, Si, O, N, and B.

In order to prevent an increase in the size of magnetic grains of the magnetic layer 14, the thickness of the non-magnetic intermediate layer 15 is preferably 20 nm or less, more preferably 10 nm or less.

In the magnetic recording medium of the fourth embodiment, since the non-magnetic intermediate layer 15 is provided, the orientation of the magnetic layer 14 can be enhanced, and thermal stability can further be improved.

Figure 7:
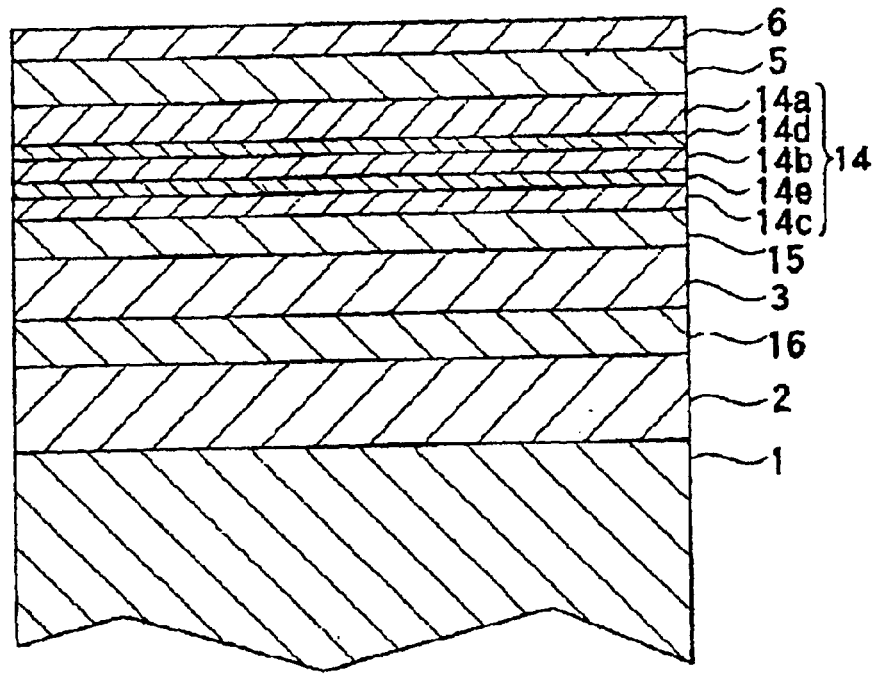
FIG. 7 is a partial cross-sectional view showing a fifth embodiment of the magnetic recording medium of the present invention.

FIG. 7 shows a fifth embodiment of the magnetic recording medium of the present invention. The magnetic recording medium shown in FIG. 7 includes a second undercoat layer 16 provided between the orientation-determining layer 2 and the non-magnetic undercoat layer 3. The second undercoat layer 16 may be formed from Cr or a Cr alloy.

In the magnetic recording medium, the crystal orientation of the non-magnetic undercoat layer 3 and the magnetic layer 4 can be enhanced, and the magnetic anisotropy of the magnetic layer 4 can further be enhanced.

Figure 8:
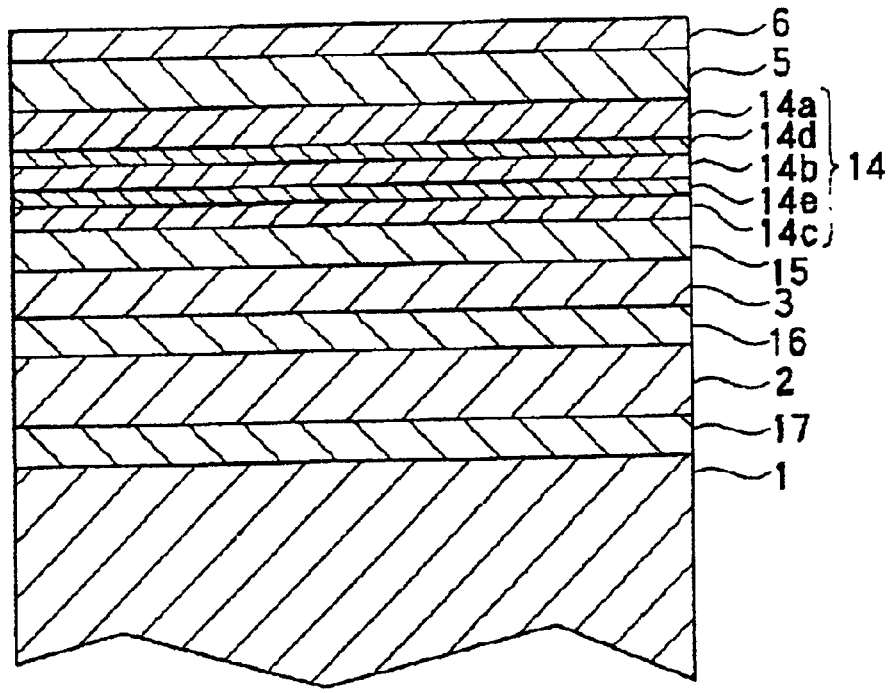
FIG. 8 is a partial cross-sectional view showing a sixth embodiment of the magnetic recording medium of the present invention.

FIG. 8 shows a sixth embodiment of the magnetic recording medium of the present invention. The magnetic recording medium shown in FIG. 8 includes an orientation-enhancing layer 17 provided between the non-magnetic substrate 1 and the orientation-determining layer 2.

The orientation-enhancing layer 17 is provided for regulating the orientation of the orientation-determining layer 2 and for preventing separation of the layer 2 from the substrate 1. The orientation-enhancing layer 17 may be formed from, for example, an alloy predominantly containing one or more elements selected from among Cr, Mo, Nb, V, Re, Zr, W, and Ti. Particularly, the layer 17 is preferably formed from Cr, or a CrMo-, CrTi-, CrV-, or CrW-based alloy.

The layer 17 may be formed from a material having a B2 structure or an amorphous structure.

Examples of the material having a B2 structure include NiAl-based alloys (e.g., Ni50Al), CoAl-based alloys (e.g., Co50Al), and FeAl-based alloys (e.g., Fe50Al).

Examples of the material having an amorphous structure include CuZr-, TiCu-, NbNi- and NiP-based alloys.

Preferred, specific examples of the material of the orientation-enhancing layer 17 include a material predominantly containing any one of NiAl, FeAl, CoAl, CoZr, CoCrZr, and CoCrC.

The thickness of the orientation-enhancing layer 17 is preferably 200 nm or less; for example, 5–200 nm. When the thickness exceeds 200 nm, the effect of enhancing the magnetic anisotropy of the magnetic layer 4 is lowered.

In the magnetic recording medium of the sixth embodiment, since the orientation-enhancing layer 17 is provided, disturbance of the orientation of the orientation-determining layer 2, which occurs during an initial stage of its growth, is prevented, the crystal orientation of the non-magnetic undercoat layer 3 and the magnetic layer 14 is improved, and the magnetic anisotropy of the magnetic layer 14 can further be enhanced. Therefore, thermal stability can further be enhanced.

In addition, peeling off of the orientation-determining layer 2 from the non-magnetic substrate 1 can be prevented.

In the present invention, as described below, a plurality of orientation-determining layers may be provided.

Figure 9:
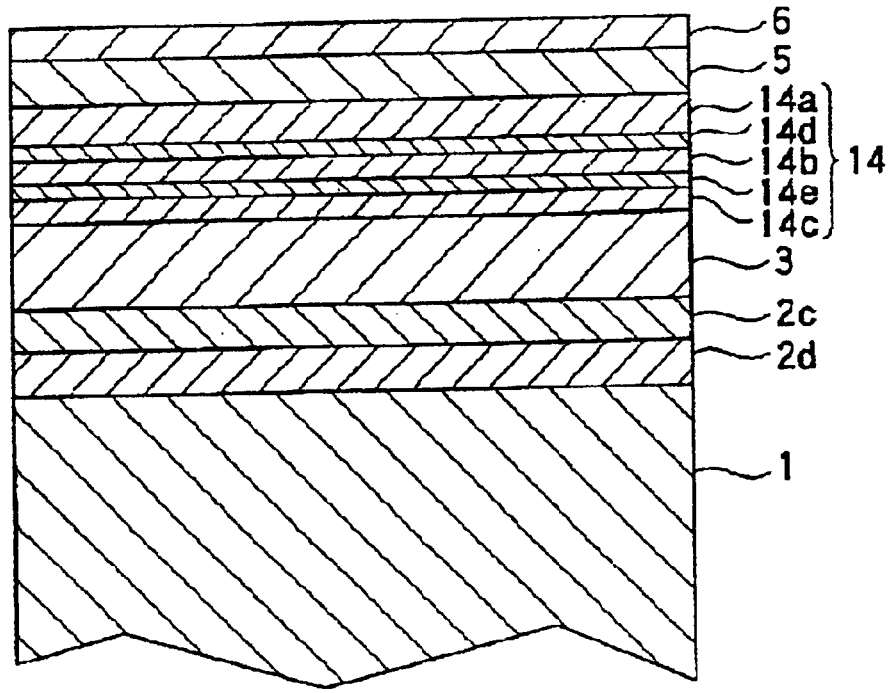
FIG. 9 is a partial cross-sectional view showing a seventh embodiment of the magnetic recording medium of the present invention.

FIG. 9 shows a seventh embodiment of the magnetic recording medium of the present invention. The magnetic recording medium shown in FIG. 9 differs from the magnetic recording medium shown in FIG. 4 in that first and second orientation-determining layers 2c and 2d are provided instead of the orientation-determining layer 2.

The material and the thickness of the orientation-determining layers 2c and 2d may be similar to those of the orientation-determining layer 2 of the magnetic recording medium shown in FIG. 1(a). The number of the orientation-determining layers may be three or more.

As described below, the magnetic recording medium of the present invention may have a structure in which a non-magnetic undercoat layer is not provided and a magnetic layer is formed directly on an orientation-determining layer. In this case, the magnetic recording medium may have a structure described herein except that a non-magnetic undercoat layer is not provided.

Figure 10:
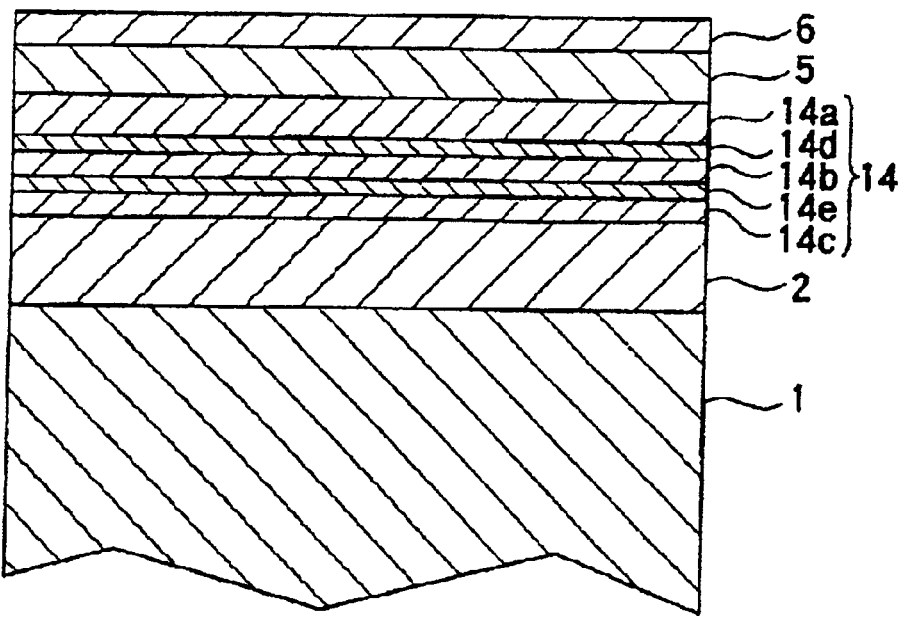
FIG. 10 is a partial cross-sectional view showing an eighth embodiment of the magnetic recording medium of the present invention.

FIG. 10 shows an eighth embodiment of the magnetic recording medium of the present invention. The magnetic recording medium shown in FIG. 10 differs from the magnetic recording medium shown in FIG. 4 in that the non-magnetic undercoat layer 3 is not formed.

In the magnetic recording medium of FIG. 10, the orientation-determining layer 2 is formed between the non-magnetic substrate 1 and the magnetic layer 14, and the layer 2 has a crystal structure in which the columnar fine crystal grains 2a are inclined in a radial direction. Therefore, the crystal orientation of the magnetic layer 14 can be improved, and the magnetic anisotropy of the magnetic layer 14 in a circumferential direction can be enhanced, resulting in improvement of thermal stability.

In the present invention, the magnetic layer may have a single-layer structure formed from a single material. In this case, the magnetic layer may be formed from the material which can be used for forming the aforementioned magnetic films 4a and 4b.

Figure 11:
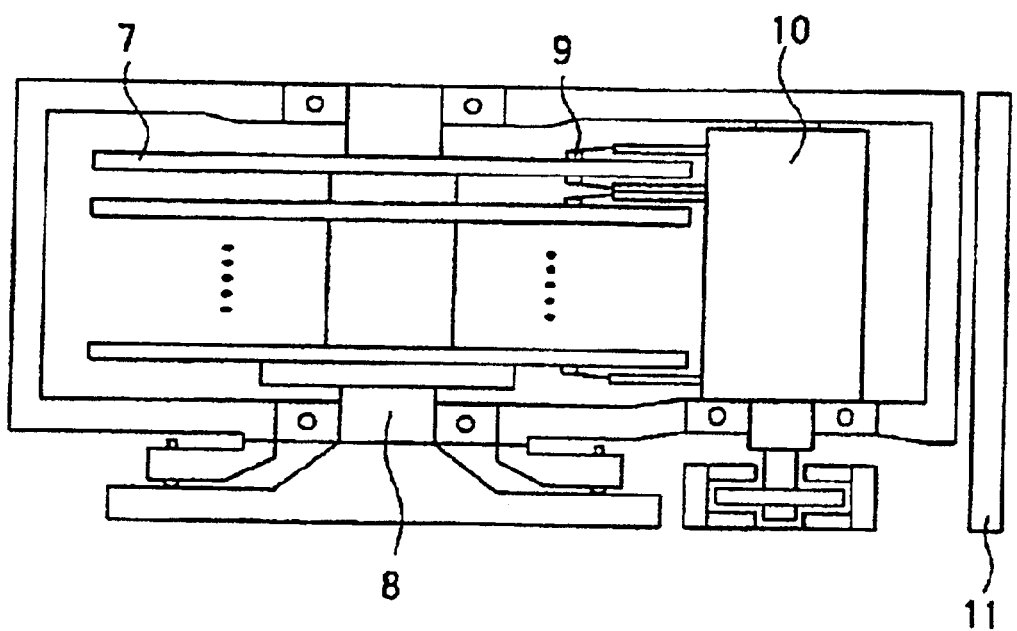
FIG. 11 is a partial cross-sectional view showing an embodiment of the magnetic recording and reproducing apparatus of the present invention.

FIG. 11 shows an embodiment of the magnetic recording and reproducing apparatus including the aforementioned magnetic recording medium. The apparatus shown in FIG. 11 includes a magnetic recording medium 7 having the aforementioned structure; a medium-driving section 8 which rotates the medium 7; a magnetic head 9 which is employed for recording data onto the medium 7 and for reproducing the data from the medium 7; a head-driving section 10; and a recorded/reproduced signal-processing system 11. In the recorded/reproduced signal-processing-system 11, incoming external signals are processed and sent to the magnetic head 9, or reproduction signals from the head 9 are processed and output to the outside.

When the magnetic recording and reproducing apparatus is employed, since the magnetic anisotropy of the magnetic recording medium can be enhanced, thermal stability is enhanced, and problems, including loss of recorded data attributed to thermal decay, can be obviated.

In addition, magnetic characteristics, such as error rate and noise characteristics, can be improved, and excellent glide height characteristics can be obtained. Therefore, high recording density can be attained.

Figure 12:
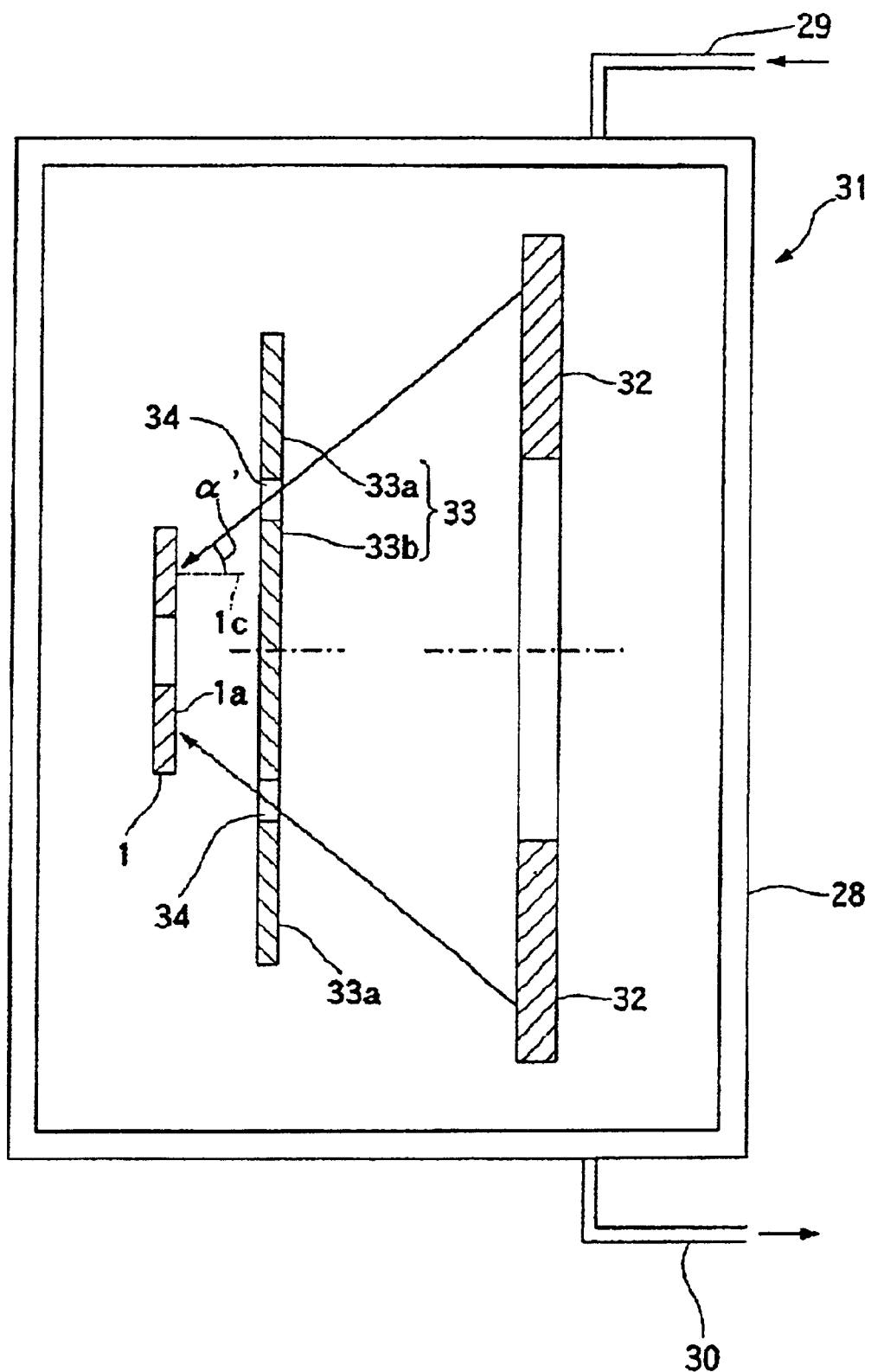
FIG. 12 is a schematic drawing showing another embodiment of the production apparatus for the magnetic recording medium of the present invention.

FIG. 12 shows another embodiment of the apparatus for producing the magnetic recording medium of the present invention. A sputtering apparatus 31 shown in FIG. 12 differs from the sputtering apparatus 21 shown in FIG. 2 in that a sputtering target 32 serving as a release source of film formation particles assumes an annular shape, and that a shielding plate 33 includes an annular outer shielding plate 33a and a disk-shaped inner shielding plate 33b provided in the aperture of the shielding plate 33a.

The outer diameter of the inner shielding plate 33b is smaller than the inner diameter of the outer shielding plate 33a. The shielding plate 33 also includes a slit 34 through which film formation particles pass, the slit 34 being formed between the inner periphery of the shielding plate 33a and the outer periphery of the shielding plate 33b.

The inner diameter of the outer shielding plate 33a and the outer diameter of the inner shielding plate 33b are set so that the incident angle $\alpha'$ of the trajectory of released film formation particles is 10–75° with respect to the non-magnetic substrate 1 when the particles are deposited onto the substrate 1.

When the orientation-determining layer 2 is formed by use of the sputtering apparatus 31, film formation particles, which have been released from the sputtering target 32 and have passed through the slit 34 are deposited onto the surface 1a of the non-magnetic substrate 1 such that the incident angle $\alpha'$ of the trajectory of the particles is 10–75° with respect to the substrate 1.

In the present invention, when the non-magnetic undercoat layer 3 and the magnetic layer 4 are formed by use of the sputtering apparatus 21 or 31, the direction of the trajectory of film formation particles may be controlled such that the projection line of the trajectory of the particles formed on a deposition surface lies substantially along a radial direction of the non-magnetic substrate, and the incident angle of the trajectory is 10–75° with respect to the substrate.

In this case, the magnetic anisotropy of the magnetic layer 4 can further be enhanced.

In the present invention, the orientation-determining layer may be formed by, instead of sputtering, any physical vapor deposition method such as vacuum deposition, gas sputtering, gas-flow sputtering, or an ion-beam method.

In the aforementioned embodiments, in relation to the coercive force of the entire magnetic layer (Hc), the ratio of a coercive force in a circumferential direction of the magnetic layer (Hcc) to a coercive force in a radial direction of the layer (Hcr); i.e., Hcc/Hcr is used as an index of magnetic anisotropy, but the present invention is not limited to the aforementioned embodiments. For example, in relation to the coercive force of each magnetic film constituting the magnetic layer (e.g., the coercive force of the second magnetic film 14b (Hc2)), the ratio of a coercive force in a circumferential direction of the magnetic film to a coercive force in a radial direction of the film may be used as an index of magnetic anisotropy.

EXAMPLES

The present invention will next further be described in detail by way of Examples, which are not intended to limit the scope of the present invention and should not be construed as doing so.

Test Example 1

By sputtering using a DC magnetron sputtering apparatus (Model 3010, product of ANELVA), an orientation-enhancing layer containing 50Ni50Al (50at % Ni-50at % Al), a non-magnetic undercoat layer containing 94Cr6Mo (94at % Cr-6at % Mo) (thickness: 10 nm), a non-magnetic intermediate layer containing 60Co40Cr (60at % Co-40at % Cr) (thickness: 2 nm), a magnetic layer containing 64Co22Cr10Pt4B (64at % Co-22at % Cr-10at % Pt-4at % B) (thickness: 18 nm), and a protective layer containing carbon (thickness: 6 nm) were formed on a non-magnetic substrate (amorphous glass, diameter: 65 mm, thickness: 0.635 mm). Subsequently, a lubrication layer containing perfluoroether was formed on the protective layer through dipping.

During film formation, the chamber of the sputtering apparatus was evacuated to $2 \times 10^{-6}$ Pa. The non-magnetic substrate 1 was heated to 200° C. Argon gas was used as a sputtering gas.

Test Example 2

A magnetic layer was formed so as to have a structure including a first magnetic film containing 64Co22Cr10Pt4B (64at % Co-22at % Cr-10at % Pt-4at % B) (thickness: 18 nm); second and third magnetic films each containing 84Co12Cr4Ta (84at % Co-12at % Cr-4at % Ta) (thickness of each film: 2.5 nm); and first and second intermediate films each containing Ru (thickness of each film: 0.8 nm), the intermediate films being provided between the magnetic films, to thereby produce a magnetic recording medium. Other conditions were similar to those of Test Example 1.

Test Example 3

Instead of an orientation-enhancing layer containing NiAl, a second undercoat layer containing Cr (thickness: 10 nm) was provided between a non-magnetic substrate and a non-magnetic undercoat layer, to thereby produce a magnetic recording medium. Other conditions were similar to those of Test Example 1.

Test Example 4

An orientation-determining layer containing 70Cr30Nb (70at % Cr-30at % Nb) (thickness: 20 nm) was formed, to thereby produce a magnetic recording medium.

The orientation-determining layer was formed using a sputtering apparatus 21 shown in FIG. 2. During formation of the layer, the direction of the trajectory 267 of film formation particles was controlled such that a projection line 27 of the trajectory 26 formed on a non-magnetic substrate 1 lied substantially along a radial direction of the substrate 1, and the incident angle of the trajectory was 10–75° with respect to the substrate 1. When the orientation-determining layer was formed, a gas mixture of nitrogen and argon (nitrogen content: 25 vol %) was used as a sputtering gas. Other conditions were similar to those of Test Example 3.

Test Examples 5 through 7

A magnetic recording medium as shown in FIG. 7 was produced as follows.

By sputtering using a DC magnetron sputtering apparatus (Model 3010, product of ANELVA), an orientation-determining layer 2 containing 70Cr30Nb (70at % Cr-30at % Nb) (thickness: 20 nm), a second undercoat layer 16 containing Cr (thickness: 10 nm), a non-magnetic undercoat layer 3 containing 94Cr6Mo (94at % Cr-6at % Mo) (thickness: 10 nm), a non-magnetic intermediate layer 15 containing 60Co40Cr 60at % Co-40at % Cr) (thickness: 2 nm), a magnetic layer 14, and a protective layer 5 containing carbon (thickness: 6 nm) were formed on a non-magnetic substrate 1 (amorphous glass, diameter: 65 mm, thickness: 0.635 mn). Subsequently, a lubrication layer 6 containing perfluoroether was formed on the protective layer 5 through dipping.

The magnetic layer 14 was formed so as to have a structure including first, second, and third magnetic films 14a, 14b, and 14c (thickness: 18 nm, 2.5 nm, and 2.5 nm, respectively), and first and second intermediate films 14d and 14e (thickness of each film: 0.8 nm) provided between the magnetic films.

The first magnetic film 14a was formed from 64Co22Cr10Pt4B (64at % Co-22at % Cr-10at % Pt-4at % B); the second and third magnetic films 14b and 14c were formed from 84Co12Cr4Ta (84at % Co-12at % Cr-4at % Ta); and the intermediate films 14d and 14e were formed from Ru.

The orientation-determining layer 2 was formed using a sputtering apparatus 21 shown in FIG. 2. During formation of the layer 2, the direction of the trajectory 26 of film formation particles was controlled such that a projection line 27 of the trajectory 26 formed on the non-magnetic substrate 1 lied substantially along a radial direction of the substrate 1, and the incident angle of the trajectory was 10–75° with respect to the substrate 1. When the orientation-determining layer 2 was formed, a gas mixture of nitrogen and argon (nitrogen content: 25 vol %) was used as a sputtering gas. Other conditions were similar to those of Test Example 4.

Test Example 8

A magnetic layer 4 was formed so as to have a structure including first and second magnetic films 4a and 4b (thickness: 18 nm and 2.5 nm, respectively), and an intermediate film 4c (thickness: 0.8 nm) provided between the magnetic films, to thereby produce a magnetic recording medium.

The first magnetic film 4a was formed from 64Co22Cr10Pt4B (64at % Co-22at % Cr-10at % Pt-4at % B); the second magnetic film 4b was formed from 84Co12Cr4Ta (84at % Co-12at % Cr-4at % Ta); and the intermediate films 4c was formed from Ru. Other conditions were similar to those of Test Examples 5 through 7.

Test Examples 9 through 13

A magnetic recording medium shown in FIG. 6 was produced as follows.

On a non-magnetic substrate 1 (glass ceramic, diameter: 65 mm, thickness: 0.635 mm) an orientation-determining layer 2 containing 70Cr30Nb (70at % Cr-30at % Nb) (thickness: 20 nm), a non-magnetic undercoat layer 3 containing 85Cr15Mo (85at % Cr-15at % Mo) (thickness: 10 nm), a non-magnetic intermediate layer 15 containing 60Co40Cr (60at % Co-40at % Cr) (thickness: 2 nm), a magnetic layer 14, a protective layer 5 containing carbon (thickness: 6 nm), and a lubrication layer 6 were formed.

The orientation-determining layer 2 was formed using a sputtering apparatus 21 shown in FIG. 2. During formation of the layer 2, the direction of the trajectory 26 of film formation particles was controlled such that a projection line 27 of the trajectory 26 formed on the non-magnetic substrate 1 lied substantially along a radial direction of the substrate 1, and the incident angle of the trajectory was 10–75° with respect to the substrate 1. When the orientation-determining layer 2 was formed, a gas mixture of nitrogen and argon (nitrogen content: 25 vol %) was used as a sputtering gas. Other conditions were similar to those of Test Examples 5 through 7.

Magnetostatic characteristics of the magnetic recording media of Test Examples 1 through 13 were measured using a vibrating sample magnetometer (VSM). The ratio of a coercive force in a circumferential direction of the entire magnetic layer (Hcc) to a coercive force in a radial direction of the magnetic layer (Hcr); i.e., Hcc/Hcr, was measured, and the ratio was regarded as an index of magnetic anisotropy.

In each of Test Examples 9 through 13, a hysteresis loop (see FIG. 5) of the magnetic recording medium was formed, and the coercive force (Hc2) and antiferromagnetic bonding magnetic field (Hbias2) of the second magnetic film 14b were obtained using the hysteresis loop.

Read-write conversion characteristics (read-write properties) of the magnetic recording medium were measured using a read/write analyzer RWA1632 and spin stand S1701 MP (products of Guzik, U.S.A.). In order to evaluate read-write conversion characteristics, measurement was performed using, as a magnetic head, a complex-type thin film magnetic recording head containing a giant magnetoresistive (GMR) element at the reproduction portion, and track-recording density was set at 600 kFCI.

Thermal stability (thermal decay) of the magnetic recording medium was measured in terms of reduction in output at a recording density of 300 kFCI at 70° C., by use of the spin stand S1701 MP.

The predominant crystal orientation planes of the non-magnetic undercoat layer and magnetic layer of the magnetic recording medium were specified through a θ/2θ method using an X-ray diffraction measurement apparatus.

The production conditions and the test results are shown in Tables 1 through 4.

Test Example 14

On a non-magnetic substrate 1, an orientation-enhancing layer 17 containing NiAl, a non-magnetic undercoat layer 3 containing 94Cr6Mo (94at % Cr-6at % Mo), a non-magnetic intermediate layer 15 containing 60Co40Cr (60at % Co-40at % Cr), a magnetic layer 14, a protective layer 5 containing carbon, and a lubrication layer 6 were formed, to thereby produce a magnetic recording medium. Other conditions were similar to those of Test Examples 9 through 13.

Test Example 15

An orientation-enhancing layer 17 containing NiP was provided, the surface of the layer 17 was subjected to texturing along a circumferential direction, and on the layer 17, a second undercoat layer 16 containing Cr, a non-magnetic intermediate layer 15 containing 60Co40Cr (60at % Co-40at % Cr), a magnetic layer 14, a protective layer 5 containing carbon, and a lubrication layer 6 were formed, to thereby produce a magnetic recording medium. Other conditions were similar to those of Test Example 14.

Test Example 16

A magnetic recording medium shown in FIG. 8 was produced as follows.

An orientation-enhancing layer 17 containing 60Co30Cr10Zr (60at % Co-30at % Cr-10at % Zr) was provided on a non-magnetic substrate 1, and on the layer 17, an orientation-determining layer 2 containing Cr25V (75at % Cr-25at % V), a second undercoat layer 16 containing Cr; a non-magnetic undercoat layer 3 containing 94Cr6Mo (94at % Cr-6at % Mo), a non-magnetic intermediate layer 15 containing 60Co40Cr, a magnetic layer 14, a protective layer 5 containing carbon, and a lubrication layer 6 were formed, to thereby produce a magnetic recording medium.

The orientation-determining layer 2 was formed using a sputtering apparatus 21 shown in FIG. 2. During formation of the layer 2, the direction of the trajectory 26 of film formation particles was controlled such that a projection line 27 of the trajectory 26 formed on the non-magnetic substrate 1 lied substantially along a radial direction of the substrate 1, and the incident angle of the trajectory was 10–75° with respect to the substrate 1. When the orientation-determining layer 2 was formed, a gas mixture of nitrogen and argon (nitrogen content: 25 vol %) was used as a sputtering gas. Other conditions were similar to those of Test Example 14.

Test Example 17

An NiP-plated aluminum alloy substrate was used as a substrate 1, and on the substrate 1, a second undercoat layer 16 containing Cr, a non-magnetic undercoat layer 3 containing 94Cr6Mo (94at % Cr-6at % Mo), a non-magnetic intermediate layer 15 containing 60Co40Cr (60at % Co-40at % Cr), a magnetic layer 14, a protective layer 5 containing carbon, and a lubrication layer 6 were formed, to thereby produce a magnetic recording medium. Other conditions were similar to those of Test Example 14.

Test Example 18

The procedure of Test Example 17 was repeated, except that the surface of the substrate 1 was subjected to texturing along a circumferential direction, to thereby produce a magnetic recording medium.

Test Example 19

The procedure of Test Example 16 was repeated, except that an aluminum substrate was used as the substrate 1, to thereby produce a magnetic recording medium.

Test Example 20

The procedure of Test Example 18 was repeated, except that a layer containing 64Co22Cr10Pt4B (64at %-22at % Cr-10at % Pt-4at % B) (thickness: 18 nm) was formed as the magnetic layer, to thereby produce a magnetic recording medium.

Magnetostatic characteristics of the magnetic recording medium of each of Test Examples 14 through 20 were measured using a vibrating sample magnetometer (VSM). The ratio of a coercive force in a circumferential direction of the entire magnetic layer (Hcc) to a coercive force in a radial direction of the magnetic layer (Hcr); i.e., Hcc/Hcr, was measured, and the ratio was regarded as an index of magnetic anisotropy.

Read-write conversion characteristics of the magnetic recording medium were measured using a read/write analyzer RWA1632 and spin stand S1701MP (products of Guzik). In order to evaluate read-write conversion characteristics, measurement was performed using, as a magnetic head, a complex-type thin film magnetic recording head containing a giant magnetoresistive (GMR) element at the reproduction portion, and track-recording density was set at 600 kFCI.

One recording track was divided into 512 sectors, and read-write conversion characteristics were evaluated in four regions (each region including 128 sectors), and variation in reproduction out signal (LFTAA) and signal to noise ratio (SNR) in the recording track was evaluated. Evaluation of read-write conversion characteristics was performed at points 20 mm and 30 mm radially distant from the center of the medium.

The production conditions and the test results are shown in Tables 5 and 6.

Test Example 21

On a non-magnetic substrate 1 (glass ceramic, diameter: 65 mm, thickness: 0.635 mm), an orientation-determining layer 2 containing 45Ni55Nb (45at % Ni-55at % Nb) (thickness: 20 nm), a second undercoat layer 16 containing Cr (thickness: 10 nm), a non-magnetic undercoat layer 3 containing 80Cr20V (80at % Cr-20at % V) (thickness: 10 nm), a non-magnetic intermediate layer 15 containing 60Co40Cr (60at % Co-40at % Cr) (thickness: 2 nm), a magnetic layer containing 66Co21Cr9Pt4B (66at % Co-21at % Cr-9at % Pt-4at % B) (thickness: 17 nm), a protective layer 5 containing carbon (thickness: 6 nm), and a lubrication layer 6 were formed, to thereby produce a magnetic recording medium.

The orientation-determining layer 2 was formed using a sputtering apparatus 21 shown in FIG. 2. During formation of the layer 2, the direction of the trajectory 26 of film formation particles was controlled such that a projection line 27 of the trajectory 26 formed on the non-magnetic substrate 1 lied substantially along a radial direction of the substrate 1, and the incident angle of the trajectory was 10–75° with respect to the substrate 1. When the orientation-determining layer 2 was formed, a gas mixture of nitrogen and argon (nitrogen content: 15 vol %) was used as a sputtering gas.

Test Examples 22 through 27

The procedure of Test Example 21 was repeated, except that the magnetic layer was changed to a magnetic layer having a configuration in which a laminated structure including a lower magnetic film formed from 83Co14Cr3Ta (83at % Co-14at % Cr-3at % Ta) (thickness: 2 nm) and an intermediate film formed from Ru (thickness: 0.8 nm) was laminated one to six times, and an uppermost magnetic film containing 66Co21Cr9Pt4B (66at % Co-21at % Cr-9at % Pt-4at % B) (thickness: 17 nm) was formed on the resultant laminate, to thereby produce a magnetic recording medium.

Test Examples 28 through 36

A magnetic recording medium shown in FIG. 7 was produced as follows.

An orientation-determining layer 2 was formed from a material shown in Tables 7-1 and 7-2, and a non-magnetic undercoat layer 3 was formed from 94Cr6Mo (94at % Cr-6at % Mo), to thereby produce a magnetic recording medium.

A magnetic layer was formed so as to have a configuration in which a laminated structure including a second magnetic film 14b formed from 83Co14Cr3Ta (83at % Co-14at % Cr-3at % Ta) and an intermediate film 14d formed from a material shown in Tables 7-1 and 7-2 was laminated on a laminated structure including a third magnetic film 14c formed from 83Co14Cr3Ta (83at % Co-14at % Cr-3at % Ta) and an intermediate film 14e formed from a material shown in Table 7, and a first magnetic film 14a containing 66Co21Cr9Pt4B (66at % Co-21at % Cr-9at % Pt-4at % B) (thickness: 17 nm) were formed on the resultant laminate. Other conditions were similar to those of Test Example 21.

Test Examples 37 through 58

An orientation-enhancing layer 17 and an orientation-determining layer 2 were formed from materials shown in Tables 8-1 and 8-2, so as to have thicknesses shown in Tables 8-1 and 8-2. The surface of the orientation-determining layer 2 was subjected to oxidation or nitridation by means of a method shown in Table 8, to thereby produce a magnetic recording medium.

A non-magnetic undercoat layer 3 (thickness: 5 nm) was formed from 80Cr20W (80at % Cr-20at % W), and a non-magnetic intermediate layer 15 (thickness: 2 nm) was formed from 63Co37Cr (63at % Co-37at % Cr).

A magnetic layer was formed so as to have a configuration in which a third magnetic film 14c formed from 73Co18Cr6Pt3Ta (73at % Co-18at % Cr-6at % Pt-3at % Ta) (thickness: 2 mn), a second intermediate film 14e formed from Ru (thickness: 0.8 nm), a second magnetic film 14b formed from 84Co12Cr4Ta (84at % Co-12at % Cr-4at % Ta) (thickness: 2.5 nm), a first intermediate film 14d formed from Ru (thickness: 0.8 nm), and a first magnetic film 14a formed from 64Co22Cr10Pt4B (64at % Co-22at % Cr-10at % Pt-4at % B) (thickness: 18 nm) were laminated successively. Other conditions were similar to those of Test Example 21.

In Tables 8-1 and 8-2, a method for oxidation or nitridation is shown in the column "oxidation nitridation." For example, "20vol % $N_2$/Ar" refers to the case in which a gas mixture of nitrogen and Ar (nitrogen content 20 vol %) was used as a sputtering gas, and "$O_2$ gas exposure" refers to the case in which the orientation-determining layer 2 was exposed to oxygen gas (pure oxygen).

Magnetostatic characteristics and read-write conversion characteristics of the magnetic recording media of Test Examples 21 through 58 were measured. The production conditions and the test results are shown in Tables 7-1, 7-2, 8-1 and 8-2.

The cross section of the magnetic recording medium of each of the Test Examples, in which, when the orientation-determining layer 2 was formed using the sputtering apparatus 21, the direction of the trajectory 26 of film formation particles was controlled such that the projection line 27 of the trajectory 26 formed on the non-magnetic substrate 1 lied along a radial direction of the substrate 1, and the incident angle of the trajectory was 10–75° with respect to the substrate 1, was observed using a TEM. The results show that the orientation-determining layer 2 has a crystal structure in which columnar fine crystal grains 2a are inclined at 10–75° in a radial direction of the medium.

TABLE 1

| | Substrate | Orientation-enhancing layer | | Orientation-determining layer | | Second undercoat layer | | Non-magnetic undercoat layer | | Non-magnetic intermediate layer |
|---|---|---|---|---|---|---|---|---|---|---|
| | | Composition | Thickness | Composition | Thickness | Composition | Thickness | Composition | Thickness | |
| Test Ex. 1 | Glass | NiAl | 50 | — | — | — | — | Cr6Mo | 10 | (*1) |
| Test Ex. 2 | Glass | NiAl | 50 | — | — | — | — | Cr6Mo | 10 | (*1) |
| Test Ex. 3 | Glass | — | — | — | — | Cr | 10 | Cr6Mo | 10 | (*1) |
| Test Ex. 4 | Glass | — | — | Cr30Nb | 20 | Cr | 10 | Cr6Mo | 10 | (*1) |
| Test Ex. 5 | Glass | — | — | Cr30Nb | 20 | Cr | 10 | Cr6Mo | 10 | (*1) |
| Test Ex. 6 | Glass | — | — | Cr30Nb | 20 | Cr | 10 | Cr6Mo | 10 | (*1) |
| Test Ex. 7 | Glass | — | — | Cr30Nb | 20 | Cr | 10 | Cr6Mo | 10 | (*1) |
| Test Ex. 8 | Glass | — | — | Cr30Nb | 20 | Cr | 10 | Cr6Mo | 10 | (*1) |

| | Magnetic layer | | | | | | | |
|---|---|---|---|---|---|---|---|---|
| | Third magnetic film | | Second intermediate film | | Second magnetic film | | First intermediate film | | First magnetic film |
| | Composition | Thickness | Composition | Thickness | Composition | Thickness | Composition | Thickness | |
| Test Ex. 1 | — | — | — | — | — | — | — | — | (*2) |
| Test Ex. 2 | Co12Cr4Ta | 2.5 | Ru | 0.8 | Co12Cr4Ta | 2.5 | Ru | 0.8 | (*2) |
| Test Ex. 3 | — | — | — | — | — | — | — | — | (*2) |
| Test Ex. 4 | — | — | — | — | — | — | — | — | (*2) |
| Test Ex. 5 | Co12Cr4Ta | 2.5 | Ru | 0.8 | Co12Cr4Ta | 2.5 | Ru | 0.8 | (*2) |
| Test Ex. 6 | Co12Cr4Ta | 2.5 | Ru | 1.4 | Co12Cr4Ta | 2.5 | Ru | 1.4 | (*2) |
| Test Ex. 7 | Co12Cr4Ta | 2.5 | Ru | 0.5 | Co12Cr4Ta | 2.5 | Ru | 0.5 | (*2) |
| Test Ex. 8 | — | — | — | — | Co12Cr4Ta | 2.5 | Ru | 0.8 | (*2) |

(Thickness unit: nm)
*1: Non-magnetic intermediate film = composition: Co40Cr, thickness: 2 nm
*2: First magnetic film = composition: Co22Cr10Pt4B, thickness: 18 nm

TABLE 2

| | Coercive force Hc (*1) (Oe) | Magnetostatic characteristics | | | | Thermal decay (%/decade) | Non-magnetic undercoat layer | | Magnetic layer | |
|---|---|---|---|---|---|---|---|---|---|---|
| | | Magnetic anisotropy Hcc/Hcr (—) | Mrt (T·nm) | PW50 (nS) | SNR (dB) | | Orientation plane | Crystal structure | Orientation plane | Crystal structure |
| Test Ex. 1 | 3213 | 1 | 0.35 | 16.77 | 16.31 | 0.85 | 112 | bcc | 100 | hcp |
| Test Ex. 2 | 3471 | 1 | 0.35 | 16.56 | 16.74 | 0.7 | 112 | bcc | 100 | hcp |
| Test Ex. 3 | 2213 | 1 | 0.27 | 16.93 | 12.9 | 0.98 | 110 | bcc | 101 | hcp |
| Test Ex. 4 | 3631 | 1.3 | 0.39 | 15.18 | 19.08 | 0.42 | 200 | bcc | 110 | hcp |
| Test Ex. 5 | 3829 | 1.3 | 0.39 | 14.83 | 19.34 | 0.26 | 200 | bcc | 110 | hcp |
| Test Ex. 6 | 3721 | 1.25 | 0.42 | 16.55 | 21.51 | 0.83 | 200 | bcc | 110 | hcp |
| Test Ex. 7 | 3694 | 1.27 | 0.41 | 16.11 | 17.95 | 0.35 | 200 | bcc | 110 | hcp |
| Test Ex. 8 | 3785 | 1.3 | 0.34 | 14.26 | 20.57 | 0.34 | 200 | bcc | 110 | hcp |

Hcc/Hcr: Ratio of a coercive force in a circumferential direction (Hcc) to a coercive force in a radial direction (Hcr)
Mrt: Product of residual magnetization and film thickness of the magnetic layer
PW50: Half power width of isolated read pulse
SNR: Signal/noise ratio
*1: Coercive force of the entire magnetic layer

TABLE 3

| | Substrate | Orientation-determining layer | | Non-magnetic undercoat layer | | Non-magnetic intermediate layer |
|---|---|---|---|---|---|---|
| | | Composition | Thickness | Composition | Thickness | |
| Test Ex. 9 | Glass | Cr30Nb | 20 | Cr15Mo | 10 | (*1) |
| Test Ex. 10 | Glass | Cr30Nb | 20 | Cr15Mo | 10 | (*1) |
| Test Ex. 11 | Glass | Cr30Nb | 20 | Cr15Mo | 10 | (*1) |
| Test Ex. 12 | Glass | Cr30Nb | 20 | Cr15Mo | 10 | (*1) |
| Test Ex. 13 | Glass | Cr30Nb | 20 | Cr15Mo | 10 | (*1) |

TABLE 3-continued

| | Orientation-determining layer | | Non-magnetic undercoat layer | | Non-magnetic intermediate | |
| --- | --- | --- | --- | --- | --- | --- |
| | Magnetic layer | | | | | |
| | Third magnetic film | | Second intermediate film | | First intermediate film | | First magnetic film | |
| | Composition | Thickness | Composition | Thickness | Composition | Thickness | Composition | Thickness |
| Test Ex. 9 | Co12Cr4Ta | 2 | Ru | 0.8 | Co12Cr4Ta | 2 | Ru | 0.8 | Co22Cr10Pt4B | 18 |
| Test Ex. 10 | Co12Cr4Ta | 2.5 | Ru | 0.8 | Co12Cr4Ta | 2.5 | Ru | 0.8 | Co22Cr10Pt4B | 18 |
| Test Ex. 11 | Co12Cr4Ta | 3 | Ru | 0.8 | Co12Cr4Ta | 3 | Ru | 0.8 | Co22Cr10Pt4B | 18 |
| Test Ex. 12 | Co12Cr4Ta | 4 | Ru | 0.8 | Co12Cr4Ta | 4 | Ru | 0.8 | Co22Cr10Pt4B | 18 |
| Test Ex. 13 | Co12Cr4Ta | 5 | Ru | 0.8 | Co12Cr4Ta | 5 | Ru | 0.8 | Co22Cr10Pt4B | 18 |

(Thickness unit: nm)
*1: Non-magnetic intermediate layer = composition: Co40Cr, thickness: 2 nm

TABLE 4

| | Coercive force | Magnetostatic characteristics | | | | | Non-magnetic undercoat layer | | Magnetic layer | | Second magnetic film Coercive force | Antiferromagnetic bonding magnetic filed |
| --- | --- | --- | --- | --- | --- | --- | --- | --- | --- | --- | --- | --- |
| | Hc (*1) (Oe) | Magnetic anisotropy Hcc/Hcr (–) | Mrt (T·nm) | PW50 (nS) | SNR (dB) | Thermal decay (%/decade) | Orientation plane | Crystal structure | Orientation plane | Crystal structure | Hc2 (*2) (Oe) | Hbias2 (*3) (Oe) |
| Test Ex. 9 | 3875 | 1.3 | 0.39 | 14.92 | 19.21 | 0.27 | 200 | bcc | 110 | hcp | 56 | 1490 |
| Test Ex. 10 | 3868 | 1.3 | 0.39 | 14.87 | 19.38 | 0.26 | 200 | bcc | 110 | hcp | 70 | 1370 |
| Test Ex. 11 | 3872 | 1.3 | 0.39 | 14.89 | 19.34 | 0.25 | 200 | bcc | 110 | hcp | 175 | 1230 |
| Test Ex. 12 | 3852 | 1.3 | 0.39 | 14.93 | 19.17 | 0.23 | 200 | bcc | 110 | hcp | 470 | 800 |
| Test Ex. 13 | 3742 | 1.3 | 0.41 | 16.11 | 17.95 | 0.30 | 200 | bcc | 110 | hcp | 690 | 440 |

Hcc/Hcr: Ratio of a coercive force in a circumferential direction (Hcc) to a coercive force in a radial direction (Hcr)
Mrt: Product of residual magnetization and film thickness of the magnetic layer
PW50: Half power width of isolated read pulse
SNR: Signal/noise ratio
*1: Coercive force of the entire magnetic layer (Hc)
*2: Coercive force of the second magnetic film (Hc2)
*3: Antiferromagnetic bonding of the second magnetic film (Hbias2)

TABLE 5

| | Substrate | Orientation-enhancing layer (*1) | | | Orientation-determining layer | | Second undercoat layer | | Non-magnetic undercoat layer | Non-magnetic intermediate layer |
| --- | --- | --- | --- | --- | --- | --- | --- | --- | --- | --- |
| | | Composition | Thickness | Texturing | Composition | Thickness | Composition | Thickness | | |
| Test Ex. 14 | Glass | NiAl | 20 | — | — | — | — | — | (*2) | (*3) |
| Test Ex. 15 | Glass | NiP | 20 | Yes | — | — | Cr | 10 | (*2) | (*3) |
| Test Ex. 16 | Glass | CoCrZr | 20 | — | Cr25V | 20 | Cr | 10 | (*2) | (*3) |
| Test Ex. 17 | Aluminum | — | — | — | — | — | Cr | 10 | (*2) | (*3) |
| Test Ex. 18 | Aluminum | — | — | Yes | — | — | Cr | 10 | (*2) | (*3) |
| Test Ex. 19 | Aluminum | CoCrZr | 20 | — | Cr25V | 20 | Cr | 10 | (*2) | (*3) |
| Test Ex. 20 | Aluminum | — | — | Yes | — | — | Cr | 10 | (*2) | (*3) |

| | Magnetic layer | | | | | | | | |
| --- | --- | --- | --- | --- | --- | --- | --- | --- | --- |
| | Third magnetic film | | Second intermediate film | | Second magnetic film | | First intermediate film | | First magnetic film |
| | Composition | Thickness | Composition | Thickness | Composition | Thickness | Composition | Thickness | |
| Test Ex. 14 | Co12Cr4Ta | 2.5 | Ru | 0.8 | Co12Cr4Ta | 2.5 | Ru | 0.8 | (*4) |
| Test Ex. 15 | Co12Cr4Ta | 2.5 | Ru | 0.8 | Co12Cr4Ta | 2.5 | Ru | 0.8 | (*4) |
| Test Ex. 16 | Co12Cr4Ta | 2.5 | Ru | 0.8 | Co12Cr4Ta | 2.5 | Ru | 0.8 | (*4) |
| Test Ex. 17 | Co12Cr4Ta | 2.5 | Ru | 0.8 | Co12Cr4Ta | 2.5 | Ru | 0.8 | (*4) |

TABLE 5-continued

| | | | | | | | | |
|---|---|---|---|---|---|---|---|---|
| Test Ex. 18 | Co12Cr4Ta | 2.5 | Ru | 0.8 | Co12Cr4Ta | 2.5 | Ru | 0.8 | (*4) |
| Test Ex. 19 | Co12Cr4Ta | 2.5 | Ru | 0.8 | Co12Cr4Ta | 2.5 | Ru | 0.8 | (*4) |
| Test Ex. 20 | — | — | — | — | — | — | — | — | (*4) |

*1: CoCrZr = Co30Cr10Zr
*2: Non-magnetic undercoat layer = composition: Cr6Mo, thickness: 10 nm
*3: Non-magnetic intermediate layer = composition: Co40Cr, thickness: 2 nm
*4: First magnetic layer = composition: Co22Cr10Pt4B, thickness: 18 nm
In Test Example 15, an undercoat layer formed from Cr was provided between the substrate and the orientation-enhancing layer (NiP).

TABLE 6

| | Magnetic anisotropy | | At 20 mm radially distant from the center of the medium | | | | At 30 mm radially distant from the center of the medium | | | | |
|---|---|---|---|---|---|---|---|---|---|---|---|
| | Hcc/Hcr (−) | | First region | Second region | Third region | Fourth region | First region | Second region | Third region | Fourth region | Standard deviation |
| Test Ex. 14 | 1 | LFTAA(μV) | 1320 | 1324 | 1319 | 1322 | 1321 | 1317 | 1322 | 1320 | 2.1339 |
| | | SNR(dB) | 16.72 | 16.74 | 16.71 | 16.75 | 16.72 | 16.74 | 16.73 | 16.75 | 0.0149 |
| Test Ex. 15 | 1.3 | LFTAA(μV) | 1470 | 1511 | 1491 | 1458 | 1455 | 1423 | 1440 | 1483 | 28.4451 |
| | | SNR(dB) | 19.02 | 18.69 | 18.8 | 19.05 | 19.03 | 19.21 | 19.15 | 18.65 | 0.2101 |
| Test Ex. 16 | 1.31 | LFTAA(μV) | 1485 | 1481 | 1484 | 1487 | 1487 | 1485 | 1488 | 1486 | 2.1998 |
| | | SNR(dB) | 19.57 | 19.58 | 19.58 | 19.57 | 19.56 | 19.57 | 19.56 | 19.56 | 0.0083 |
| Test Ex. 17 | 1 | LFTAA(μV) | 1020 | 1024 | 1014 | 1027 | 987 | 991 | 990 | 985 | 18.1088 |
| | | SNR(dB) | 15.82 | 15.79 | 15.84 | 15.75 | 15.76 | 15.77 | 15.73 | 15.74 | 0.0389 |
| Test Ex. 18 | 1.3 | LFTAA(μV) | 1491 | 1476 | 1454 | 1534 | 1446 | 1489 | 1451 | 1439 | 31.7085 |
| | | SNR(dB) | 19.09 | 19.21 | 19.14 | 19.1 | 19.12 | 18.69 | 18.99 | 19.1 | 0.1596 |
| Test Ex. 19 | 1.29 | LFTAA(μV) | 1490 | 1491 | 1492 | 1490 | 1488 | 1487 | 1488 | 1490 | 1.6903 |
| | | SNR(dB) | 19.62 | 19.62 | 19.61 | 19.62 | 19.63 | 19.62 | 19.62 | 19.62 | 0.0053 |
| Test Ex. 20 | 1.3 | LFTAA(μV) | 1490 | 1492 | 1495 | 1491 | 1488 | 1485 | 1488 | 1489 | 3.0119 |
| | | SNR(dB) | 18.99 | 18.92 | 18.95 | 19.02 | 18.87 | 18.93 | 18.74 | 18.88 | 0.0861 |

Hcc/Hcr: Ratio of a coercive force in a circumferential direction (Hcc) to a coercive force in a radial direction (Hcr)
LFTAA: Reproduction output signal (low frequency)
SNR: Signal/noise ratio
First region: sector 0–127
Second region: sector 128–255
Third region: sector 256–383
Fourth region: sector 384–511

TABLE 7-1

| | Orientation-determining layer | | Second undercoat layer | | Non-magnetic undercoat layer | | Non-magnetic intermediate layer |
|---|---|---|---|---|---|---|---|
| | Composition | Thickness | Composition | Thickness | Composition | Thickness | |
| Test Ex. 21 | 45Ni55Nb | 20 | Cr | 10 | Cr20V | 10 | (*1) |
| Test Ex. 22 | 45Ni55Nb | 20 | Cr | 10 | Cr20V | 10 | (*1) |
| Test Ex. 23 | 45Ni55Nb | 20 | Cr | 10 | Cr20V | 10 | (*1) |
| Test Ex. 24 | 45Ni55Nb | 20 | Cr | 10 | Cr20V | 10 | (*1) |
| Test Ex. 25 | 45Ni55Nb | 20 | Cr | 10 | Cr20V | 10 | (*1) |
| Test Ex. 26 | 45Ni55Nb | 20 | Cr | 10 | Cr20V | 10 | (*1) |
| Test Ex. 27 | 45Ni55Nb | 20 | Cr | 10 | Cr20V | 10 | (*1) |
| Test Ex. 28 | 50Ni50Ta | 20 | Cr | 10 | Cr6Mo | 10 | (*1) |
| Test Ex. 29 | 50Ni50Ta | 20 | Cr | 10 | Cr6Mo | 10 | (*1) |
| Test Ex. 30 | 48Ni48Ta4Zr | 20 | Cr | 10 | Cr6Mo | 10 | (*1) |
| Test Ex. 31 | 48Ni48Ta4Zr | 20 | Cr | 10 | Cr6Mo | 10 | (*1) |
| Test Ex. 32 | 48Ni48Ta4Zr | 20 | Cr | 10 | Cr6Mo | 10 | (*1) |
| Test Ex. 33 | 48Ni48Ta4Zr | 20 | Cr | 10 | Cr6Mo | 10 | (*1) |
| Test Ex. 34 | 48Ni48Ta4Zr | 20 | Cr | 10 | Cr6Mo | 10 | (*1) |
| Test Ex. 35 | 48Ni48Ta4Zr | 20 | Cr | 10 | Cr6Mo | 10 | (*1) |
| Test Ex. 36 | 48Ni48Ta4Zr | 20 | Cr | 10 | Cr6Mo | 10 | (*1) |

(Thickness unit: nm)
*1: Non-magnetic intermediate layer = composition: Co40Cr, thickness: 2 nm

TABLE 7-2

| | Lower magnetic film | | Intermediate film | | Number of laminated structure (*2) | Uppermost magnetic film | | Coercive force (Oe) | Magnetic anisotropy (-) | Mrt (T · nm) | Thermal decay (%/decade) |
|---|---|---|---|---|---|---|---|---|---|---|---|
| | Composition | Thickness | Composition | Thickness | | | Thickness | | | | |
| Test Ex. 21 | — | — | — | — | — | Co21Cr9Pt4B | 17 | 3876 | 1.29 | 0.4 | 0.43 |
| Test Ex. 22 | Co14Cr3Ta | 2 | Ru | 0.8 | 1 | Co21Cr9Pt4B | 17 | 3798 | 1.3 | 0.36 | 0.36 |
| Test Ex. 23 | Co14Cr3Ta | 2 | Ru | 0.8 | 2 | Co21Cr9Pt4B | 17 | 3767 | 1.3 | 0.4 | 0.27 |
| Test Ex. 24 | Co14Cr3Ta | 2 | Ru | 0.8 | 3 | Co21Cr9Pt4B | 17 | 3854 | 1.3 | 0.36 | 0.22 |
| Test Ex. 25 | Co14Cr3Ta | 2 | Ru | 0.8 | 4 | Co21Cr9Pt4B | 17 | 3822 | 1.31 | 0.4 | 0.18 |
| Test Ex. 26 | Co14Cr3Ta | 2 | Ru | 0.8 | 5 | Co21Cr9Pt4B | 17 | 3843 | 1.31 | 0.36 | 0.14 |
| Test Ex. 27 | Co14Cr3Ta | 2 | Ru | 0.8 | 6 | Co21Cr9Pt4B | 17 | 3855 | 1.3 | 0.4 | 0.11 |
| Test Ex. 28 | Co14Cr3Ta | 1 | Cr | 1.0 | 2 | Co21Cr9Pt4B | 17 | 3659 | 1.28 | 0.4 | 0.28 |
| Test Ex. 29 | Co14Cr3Ta | 1.5 | Ir | 0.5 | 2 | Co21Cr9Pt4B | 17 | 3678 | 1.29 | 0.4 | 0.27 |
| Test Ex. 30 | Co14Cr3Ta | 1.5 | Rh | 0.8 | 2 | Co21Cr9Pt4B | 17 | 3598 | 1.29 | 0.4 | 0.29 |
| Test Ex. 31 | Co14Cr3Ta | 1 | Mo | 0.6 | 2 | Co21Cr9Pt4B | 17 | 3643 | 1.29 | 0.4 | 0.3 |
| Test Ex. 32 | Co14Cr3Ta | 1 | Cu | 0.8 | 2 | Co21Cr9Pt4B | 17 | 3651 | 1.3 | 0.4 | 0.28 |
| Test Ex. 33 | Co14Cr3Ta | 1 | Re | 0.5 | 2 | Co21Cr9Pt4B | 17 | 3675 | 1.3 | 0.4 | 0.28 |
| Test Ex. 34 | Co14Cr3Ta | 1 | V | 1.0 | 2 | Co21Cr9Pt4B | 17 | 3641 | 1.29 | 0.4 | 0.29 |
| Test Ex. 35 | Co14Cr3Ta | 1 | Pd | 0.8 | 2 | Co21Cr9Pt4B | 17 | 3426 | 1.25 | 0.45 | 0.44 |
| Test Ex. 36 | Co14Cr3Ta | 1 | Au | 0.8 | 2 | Co21Cr9Pt4B | 17 | 3411 | 1.25 | 0.45 | 0.44 |

(Thickness unit: nm)
*2: Number of laminated structures, each including a lower magnetic film and an intermediate film

TABLE 8-1

| | Substrate | Orientation-enhancing layer | | Orientation-determining layer | | Second undercoat layer | | Non-magnetic undercoat layer | |
|---|---|---|---|---|---|---|---|---|---|
| | | Composition | Thickness | Composition | Thickness | Composition | Thickness | Composition | Thickness |
| Test Ex. 37 | Glass | — | — | 85Cr15Ti | 20 | Cr | 10 | Cr20W | 5 |
| Test Ex. 38 | Glass | — | — | 85Cr15Ti | 20 | Cr | 10 | Cr20W | 5 |
| Test Ex. 39 | Glass | — | — | 80Cr20Mo | 20 | Cr | 10 | Cr20W | 5 |
| Test Ex. 40 | Glass | — | — | 80Cr20W | 15 | Cr | 10 | Cr20W | 5 |
| Test Ex. 41 | Glass | — | — | 80Cr20W | 15 | Cr | 10 | Cr20W | 5 |
| Test Ex. 42 | Glass | — | — | 80Cr20Ru | 15 | Cr | 10 | Cr20W | 5 |
| Test Ex. 43 | Glass | — | — | 85Cr15Re | 20 | Cr | 10 | Cr20W | 5 |
| Test Ex. 44 | Glass | — | — | V | 20 | Cr | 10 | Cr20W | 5 |
| Test Ex. 45 | Glass | — | — | Cr | 20 | Cr | 10 | Cr20W | 5 |
| Test Ex. 46 | Glass | 50Ni50Al | 10 | Nb | 25 | Cr | 10 | Cr20W | 5 |
| Test Ex. 47 | Glass | 50Fe50Al | 10 | Mo | 20 | Cr | 10 | Cr20W | 5 |
| Test Ex. 48 | Glass | — | — | Ta | 20 | Cr | 10 | Cr20W | 5 |
| Test Ex. 49 | Glass | — | — | Ta | 20 | Cr | 10 | Cr20W | 5 |
| Test Ex. 50 | Glass | 80Co20Zr | 10 | Ta | 20 | Cr | 10 | Cr20W | 5 |
| Test Ex. 51 | Glass | 50Ni50Al | 15 | W | 20 | Cr | 10 | Cr20W | 5 |
| Test Ex. 52 | Glass | — | — | 66Be34Nb | 20 | Cr | 10 | Cr20W | 5 |
| Test Ex. 53 | Glass | — | — | 66V34Ta | 20 | Cr | 10 | Cr20W | 5 |
| Test Ex. 54 | Glass | — | — | 50Ta50Zr | 20 | Cr | 10 | Cr20W | 5 |
| Test Ex. 55 | Glass | — | — | 50Nb50Ta | 20 | Cr | 10 | Cr20W | 5 |
| Test Ex. 56 | Aluminum | 60Co30Cr10Zr | 30 | 65Co35Ta | 20 | Cr | 10 | Cr20W | 5 |
| Test Ex. 57 | Aluminum | 56Co26Cr18C | 30 | 70Co30Nb | 20 | Cr | 10 | Cr20W | 5 |
| Test Ex. 58 | Glass | — | — | 80Ni20P | 25 | Cr | 10 | Cr20W | 5 |

(Thickness unit: nm)

TABLE 8-2

| | Non-magnetic intermediate layer | | Magnetic layer | Oxidation · Nitridation | Magnetostatic characteristics | | Thermal decay (%/decade) |
|---|---|---|---|---|---|---|---|
| | Composition | Thickness | | | Coercive force (Oe) | Magnetic anisotropy (-) | |
| Test Ex. 37 | Co37Cr | 2 | (*1) | — | 3654 | 1.23 | 0.24 |
| Test Ex. 38 | Co37Cr | 2 | (*1) | 20 vol % N₂/Ar | 3721 | 1.26 | 0.21 |
| Test Ex. 39 | Co37Cr | 2 | (*1) | — | 3621 | 1.27 | 0.24 |
| Test Ex. 40 | Co37Cr | 2 | (*1) | — | 3792 | 1.26 | 0.23 |

TABLE 8-2-continued

|  | Non-magnetic intermediate layer | | Magnetic layer | Oxidation · Nitridation | Magnetostatic characteristics | | |
|---|---|---|---|---|---|---|---|
|  | Composition | Thickness |  |  | Coercive force (Oe) | Magnetic anisotropy (−) | Thermal decay (%/decade) |
| Test Ex. 41 | Co37Cr | 2 | (*1) | 20 vol % O₂/Ar | 3547 | 1.31 | 0.20 |
| Test Ex. 42 | Co37Cr | 2 | (*1) | — | 3687 | 1.25 | 0.24 |
| Test Ex. 43 | Co37Cr | 2 | (*1) | — | 3819 | 1.26 | 0.23 |
| Test Ex. 44 | Co37Cr | 2 | (*1) | — | 3683 | 1.23 | 0.24 |
| Test Ex. 45 | Co37Cr | 2 | (*1) | — | 3599 | 1.25 | 0.24 |
| Test Ex. 46 | Co37Cr | 2 | (*1) | — | 3533 | 1.27 | 0.24 |
| Test Ex. 47 | Co37Cr | 2 | (*1) | — | 3751 | 1.17 | 0.25 |
| Test Ex. 48 | Co37Cr | 2 | (*1) | — | 3878 | 1.3 | 0.22 |
| Test Ex. 49 | Co37Cr | 2 | (*1) | N₂ gas exposure | 3799 | 1.34 | 0.20 |
| Test Ex. 50 | Co37Cr | 2 | (*1) | N₂ gas exposure | 3925 | 1.37 | 0.18 |
| Test Ex. 51 | Co37Cr | 2 | (*1) | — | 3616 | 1.21 | 0.25 |
| Test Ex. 52 | Co37Cr | 2 | (*1) | — | 3968 | 1.35 | 0.20 |
| Test Ex. 53 | Co37Cr | 2 | (*1) | — | 3598 | 1.31 | 0.23 |
| Test Ex. 54 | Co37Cr | 2 | (*1) | — | 3469 | 1.28 | 0.25 |
| Test Ex. 55 | Co37Cr | 2 | (*1) | — | 3983 | 1.36 | 0.20 |
| Test Ex. 56 | Co37Cr | 2 | (*1) | 20 vol % N₂/Ar | 3500 | 1.35 | 0.23 |
| Test Ex. 57 | Co37Cr | 2 | (*1) | 20 vol % N₂/Ar | 3904 | 1.31 | 0.21 |
| Test Ex. 58 | Co37Cr | 2 | (*1) | O₂ gas exposure | 3771 | 1.15 | 0.22 |

(Thickness unit: nm)
*1: Magnetic layer = third magnetic film (Co18Cr6Pt3Ta, thickness: 2 nm)/first antiferromagnetic film (Ru, thickness: 0.8 nm)/second magnetic film (Co12Cr4Ta, thickness: 2.5 nm)/second antiferromagnetic film (Ru, thickness: 0.8 nm)/first magnetic film (Co22Cr10Pt4B, thickness: 16 nm)

As is apparent from Tables 1 and 2, in Test example 4 in which magnetic anisotropy is imparted to the magnetic layer by means of the orientation-determining layer 2 or in Test Example 2 in which the magnetic layer has an AFC structure, thermal stability is enhanced as compared with the case of Test Example 1 in which the orientation-determining layer is not provided and the magnetic layer does not have an AFC structure. In Test Examples 5 through 8 in which the orientation-determining layer 2 is provided and the magnetic layer has an AFC structure, remarkable effects of enhancing thermal stability are obtained as compared with the cases of Test Examples 2 and 4.

The results show that, particularly in Test Examples 5 through 7 in which the magnetic layer has a structure including three magnetic films and two intermediate films, thermal stability is enhanced.

The results also show that, in Test Example 5 in which the intermediate films 4d and 4e have a thickness of 0.8 nm, thermal stability is more excellent as compared with the case of Test Example 6 in which the films have a thickness of 1.4 nm or the case of Test Example 7 in which the films have a thickness of 0.5 nm.

As is apparent from Tables 3 and 4, in Test Examples 9 through 12 in which the antiferromagnetic bonding magnetic field (Hbias2) of the second magnetic film 14b is larger than the coercive force (Hc2), noise characteristics and PW50 are more excellent as compared with the case of Test Example 13 in which Hbias2 is smaller than Hc2.

As is apparent from Tables 5 and 6, in Test Examples 15, 18, and 20 in which texturing is carried out, although magnetic anisotropy is enhanced, variation in magnetic characteristics in a circumferential direction is large.

This variation is thought to be attributed to the phenomenon that antiferromagnetic bonding between the magnetic films becomes unsatisfactory locally, which is caused by non-uniform thickness of the intermediate film due to surface irregularities of the NiP film (orientation-enhancing layer).

In addition, the results show that, in Test Examples 14 and 17 in which texturing is not carried out, magnetic anisotropy is low, and reproduction output and noise characteristics are impaired.

The results also show that, in Test Examples 16 and 19 in which the orientation-determining layer 2 is provided, although texturing is not carried out, magnetic anisotropy is enhanced, excellent reproduction output and noise characteristics are obtained, and variation in magnetic characteristics in a circumferential direction is prevented.

As is apparent from Tables 7-1 and 7-2, in Test Examples 22 through 27, when the number of laminated structures is larger, thermal stability is more enhanced.

The results also show that, in Test Examples 28 through 36, even when the intermediate film is formed from, instead of Ru, Cr, Ir, Rh, Mo, Cu, Re, or V, the effect of enhancing thermal stability is obtained.

As is apparent from Tables 8-1 and 8-2, in Test Examples 37 through 43, even when the orientation-determining layer 2 is formed from a Cr alloy (e.g., CrTi or CrMo), the effect of enhancing thermal stability is obtained.

The results show that, in Test Examples 44 through 51, even when the orientation-determining layer 2 is formed from a single element such as V, the effect of enhancing thermal stability is obtained.

The results also show that, in Test Examples 52 through 57, even when the orientation-determining layer 2 is formed from an Nb alloy such as BeNb or a Ta alloy such as VTa, the effect of enhancing thermal stability is obtained.

The results further show that, when the orientation-determining layer 2 is subjected to oxidation or nitridation, magnetic characteristics such as thermal stability are enhanced.

The results also show that, when the orientation-enhancing layer 17 is provided, magnetic anisotropy is enhanced, and thermal stability is enhanced.

As described above, in the magnetic recording medium of the present invention, since an orientation-determining layer has a crystal structure in which columnar fine crystal grains are inclined in a radial direction, the crystal orientation of a non-magnetic undercoat layer and a magnetic layer can be improved, and the magnetic anisotropy of the magnetic layer in a circumferential direction can be enhanced.

Therefore, the crystal magnetic anisotropy constant (Ku) can be enhanced, resulting in improvement of thermal stability.

Furthermore, since the magnetic layer includes a plurality of magnetic films, and has a structure such that antiferromagnetic bonding is formed between the magnetic films, the magnetic films other than a primary magnetic film of largest coercive force assume an apparent non-magnetized state due to antiferromagnetic bonding between the magnetic films; or the primary magnetic film assumes a state in which apparent magnetization of the primary magnetic film is reduced in an amount corresponding to the magnetization of the magnetic films other than the primary magnetic film.

Therefore, the volume of magnetic grains can be increased sufficiently without adversely affecting noise characteristics and resolution, thermal stabilization can be attained, and thermal stability can further be enhanced.

In general, the strength of antiferromagnetic bonding between two magnetic films is greatly affected by the thickness of an intermediate film provided between the magnetic films. Therefore, when a film formed below a magnetic layer has large surface irregularities, the thickness of the intermediate film becomes non-uniform, the strength of antiferromagnetic bonding is lowered locally, and thus thermal stability tends to become unsatisfactory.

In contrast, in the magnetic recording medium of the present invention, since the orientation-determining layer has a crystal structure in which columnar fine crystal grains are inclined in a radial direction, the magnetic anisotropy of the magnetic layer in a circumferential direction can be enhanced. Therefore, texturing is not required during production of the medium, resulting in high surface smoothness of the orientation-determining layer.

Consequently, non-uniformity in the thickness of the intermediate film, which is caused by surface irregularities of the orientation-determining layer, can be prevented, the strength of antiferromagnetic bonding can be enhanced, and satisfactory effects of enhancing thermal stability can be obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording disk comprising a non-magnetic substrate, an orientation-determining layer, a non-magnetic undercoat layer, a magnetic layer, and a protective layer, in order, wherein:
   the non-magnetic undercoat layer has a bcc structure;
   the orientation-determining layer causes the non-magnetic undercoat layer to have a predominant orientation plane of (200) and has a crystal structure in which columnar crystal grains are inclined in a radial direction;
   the ratio of a coercive force in a circumferential direction of the magnetic layer (Hcc) to a coercive force in a radial direction of the magnetic layer (Her) is more than 1;
   and the magnetic layer includes a plurality of magnetic films having an hcp structure and a predominant orientation plane of (110), and permits antiferromagnetic bonding to be formed therebetween.

2. A magnetic recording disk according to claim 1, wherein the magnetic layer has a laminated ferrimagnetic structure in which the directions of the magnetic moments of adjacent magnetic films are opposite to each other.

3. A magnetic recording disk according to claim 1, wherein the magnetic layer has a structure including a plurality of magnetic films and an intermediate film provided therebetween.

4. A magnetic recording disk according to claim 1, wherein the magnetic layer has two or more laminated structures, each including a magnetic film and an intermediate film adjacent thereto.

5. A magnetic recording disk according to claim 1, wherein, among the plurality of magnetic films, a magnetic film adjacent to a primary magnetic film having the largest coercive force has an antiferromagnetic bonding magnetic field larger than the coercive force of the magnetic film adjacent to the primary magnetic film.

6. A magnetic recording disk according to claim 2, wherein the intermediate film comprises a material predominantly containing at least one element selected from the group consisting of Ru, Cr, Ir, Rh, Mo, Cu, Co, Re, and V.

7. A magnetic recording disk according to claim 1, wherein the orientation-determining layer comprises one or more elements selected from the group consisting of Cr, V, Nb, Mo, W, and Ta.

8. A magnetic recording disk according to claim 1, wherein the orientation-determining layer comprises an alloy predominantly containing Cr.

9. A magnetic recording disk according to claim 1, wherein the orientation-determining layer predominantly comprises a Ta-containing alloy $X_1Ta$, wherein $X_1$ is one or more elements selected from the group consisting of Be, Co, Cr, Fe, Nb, Ni, V, Zn, and Zr, and has a Fd3m structure or an amorphous structure.

10. A magnetic recording disk according to claim 1, wherein the orientation-determining layer predominantly comprises an Nb-containing alloy $X_2Nb$, wherein $X_2$ is one or more elements selected from the group consisting of Be, Co, Cr, Fe, Ni, Ta, V, Zn, and Zr, and has a Fd3m structure or an amorphous structure.

11. A magnetic recording disk according to claim 1, wherein the orientation-determining layer predominantly comprises CoTa, wherein the Ta content is 30–75 at % or CoNb wherein the Nb content is 30–75 at %, and has a Fd3m structure or an amorphous structure.

12. A magnetic recording disk according to claim 1, wherein the orientation-determining layer predominantly comprises CrTa wherein the Ta content is 15–75 at % or CrNb wherein the Nb content is 15–75 at %.

13. A magnetic recording disk according to claim 1, wherein the orientation-determining layer predominantly comprises NiTa wherein the Ta content is 30–75 at % or NiNb wherein the Nb content is 30–75 at %, and has a Fd3m structure or an amorphous structure.

14. A magnetic recording disk according to claim 1, wherein the orientation-determining layer comprises a non-magnetic metal having a Fd3m structure.

15. A magnetic recording disk according to claim 1 or 2, wherein the orientation-determining layer comprises a non-magnetic metal having a C15 structure.

16. A magnetic recording disk according to claim 1, wherein an orientation-enhancing layer is formed between the non-magnetic substrate and the orientation-determining layer.

17. A magnetic recording disk according to claim 16, wherein the orientation-enhancing layer comprises a material having a B2 structure or an amorphous structure.

18. A magnetic recording disk according to claim 16, wherein the orientation-enhancing layer predominantly comprises any one selected from the group consisting of NiAl, FeAl, CoAl, CoZr, CoCrZr, and CoCrC.

19. A magnetic recording disk according to claim 1, wherein a plurality of orientation-determining layers are provided.

20. A magnetic recording disk comprising a non-magnetic substrate, an orientation-determining layer for arranging the crystal orientation of a layer provided directly thereon, a magnetic layer, and a protective layer, in order, wherein:
the orientation-determining layer has a crystal structure in which columnar crystal grains are inclined in a radial direction;
the ratio of a coercive force in a circumferential direction of the magnetic layer (Hcc) to a coercive force in a radial direction of the magnetic layer (Hcr) is more than 1; and
the magnetic layer includes a plurality of magnetic films having an hcp structure and a predominant orientation plane of (110), and permits antiferromagnetic bonding to be formed therebetween.

21. A magnetic recording disk comprising a non-magnetic substrate, an orientation-determining layer for arranging the crystal orientation of a layer provided directly thereon, a non-magnetic undercoat layer, a magnetic layer, and a protective layer, the layers being formed on the substrate, wherein:
the non-magnetic undercoat layer has a bcc structure;
the orientation-determining layer is formed from an NiP alloy having an amorphous structure and has a crystal structure in which columnar crystal grains are inclined in a radial direction of the substrate, and causes the non-magnetic undercoat layer to have a predominant orientation plane of (200);
the ratio of a coercive force in a circumferential direction of the magnetic layer (Hcc) to a coercive force in a radial direction of the magnetic layer (Hcr) is more than 1; and
the magnetic layer includes a plurality of magnetic films having an hcp structure and a predominant orientation plane of (110), and permits antiferromagnetic bonding to be formed therebetween.

22. A magnetic recording disk according to claim 1, wherein the orientation-determining layer comprises nitrogen or oxygen in an amount of at least 1 at %.

23. A magnetic recording disk according to claim 20, wherein the orientation-determining layer comprises nitrogen or oxygen in an amount of at least 1 at %.

24. A magnetic recording disk according to claim 21, wherein the orientation-determining layer comprises nitrogen or oxygen in an amount of at least 1 at %.

25. A process for producing a magnetic recording disk comprising a non-magnetic substrate, an orientation-determining layer for causing a non-magnetic undercoat layer to have a predominant orientation plane of (200), wherein the orientation-determining layer has a crystal structure in which columnar crystal grains are inclined in a radial direction of the substrate, a non-magnetic undercoat layer, a magnetic layer, wherein the ratio of a coercive force in a circumferential direction of the magnetic layer (Hcc) to a coercive force in a radial direction of the magnetic layer (Hcr) is more than 1, and a protective layer, in order, wherein the non-magnetic undercoat layer has a bcc structure; and the magnetic layer includes a plurality of magnetic films having an hcp structure and a predominant orientation plane of (110), and permits antiferromagnetic bonding to be formed therebetween, which process comprises:
releasing from a release source film formation particles containing a material constituting the orientation-determining layer to form the layer, and then
depositing the particles onto a deposition surface, wherein a direction of a trajectory of the film formation particles is controlled such that a projection line of the trajectory of the particles formed on the deposition surface lies substantially along a radial direction of a non-magnetic substrate, and such that an incident angle of the trajectory of the particles is 10–75° with respect to the non-magnetic substrate.

26. A process for producing a magnetic recording disk according to claim 25, further comprising subjecting the orientation-determining layer to oxidation or nitridation.

27. A process for producing a magnetic recording disk according to claim 25, wherein the orientation-determining layer is formed by sputtering using a sputtering target as a release source of film formation particles.

28. A process for producing a magnetic recording disk according to claim 27, further comprising subjecting the orientation-determining layer to oxidation or nitridation using a sputtering gas containing oxygen or nitrogen while forming the orientation-determining layer.

29. A process for producing a magnetic recording disk according to claim 26, wherein oxidation or nitridation is carried out by bringing the surface of the orientation-determining layer into contact with an oxygen-containing gas or a nitrogen-containing gas.

30. A magnetic recording and reproducing apparatus comprising a magnetic recording disk, and a magnetic head for recording data onto the disk and reproducing the data therefrom, wherein:
the magnetic recording disk comprises a non-magnetic substrate, an orientation-determining layer for causing the non-magnetic undercoat layer to have a predominant orientation plane of (200), a non-magnetic undercoat layer, a magnetic layer, and a protective layer, in order, wherein the non-magnetic undercoat layer has a bcc structure; the orientation-determining layer has a crystal structure in which columnar crystal grains are inclined in a radial direction; the ratio of a coercive force in a circumferential direction of the magnetic layer (Hcc) to a coercive force in a radial direction of the magnetic layer (Hcr); is more than 1; and the magnetic layer includes a plurality of magnetic films having an hcp structure and a predominant orientation plane of (110), and permits antiferromagnetic bonding to be formed therebetween.

* * * * *